(12) United States Patent
Mano et al.

(10) Patent No.: US 7,517,426 B2
(45) Date of Patent: Apr. 14, 2009

(54) SHEET MATERIAL, A BLOCK LIKE SHEET MATERIAL, A METHOD FOR PRODUCING A SHEET MATERIAL, A METHOD FOR SEPARATING AND RETRIEVING A FIBER FABRICATION LAYER UNIT AND A BACKING LAYER FROM A TILE CARPET

(75) Inventors: Hiroshi Mano, Tokyo (JP); Seishiro Ishiyama, Tokyo (JP); Yasuo Yanagida, Tokyo (JP)

(73) Assignee: Tajima Incorporated, Tokyo (JP)

( * ) Notice: Subject to any disclaimer, the term of this patent is extended or adjusted under 35 U.S.C. 154(b) by 126 days.

(21) Appl. No.: 10/513,647

(22) PCT Filed: Apr. 28, 2004

(86) PCT No.: PCT/JP2004/006207

§ 371 (c)(1),
(2), (4) Date: Nov. 5, 2004

(87) PCT Pub. No.: WO2005/090709

PCT Pub. Date: Sep. 29, 2005

(65) Prior Publication Data

US 2006/0147669 A1    Jul. 6, 2006

(30) Foreign Application Priority Data

Mar. 5, 2004   (JP) ............................. 2004-061910

(51) Int. Cl.
| | |
|---|---|
| B29C 65/02 | (2006.01) |
| B29C 65/48 | (2006.01) |
| B32B 37/04 | (2006.01) |
| B32B 37/06 | (2006.01) |
| B32B 37/14 | (2006.01) |
| B32B 3/06 | (2006.01) |
| B65H 29/00 | (2006.01) |
| D03D 27/02 | (2006.01) |
| B29C 65/52 | (2006.01) |
| B32B 37/02 | (2006.01) |
| B32B 38/18 | (2006.01) |

(52) U.S. Cl. .................... 156/304.4; 428/96; 156/289; 156/449; 156/555

(58) Field of Classification Search ................. 428/96; 156/289, 304.4, 449, 555
See application file for complete search history.

(56) References Cited

U.S. PATENT DOCUMENTS 3,957,555 A * 5/1976 Bondi .......................... 156/72

(Continued)

FOREIGN PATENT DOCUMENTS

EP         0490529         6/1992

(Continued)

*Primary Examiner*—Philip C Tucker
*Assistant Examiner*—Sonya Mazumdar
(74) *Attorney, Agent, or Firm*—Greer, Burns & Crain, Ltd.

(57) ABSTRACT

An effective recycling method for a fiber fabrication layer unit which has been separated and retrieved from a tile carpet and which comprises a fiber assembled layer to which a part of a backing layer being integrally contacted and a method for producing a product to be recycled. The method for effectively recycling the fiber fabrication layer unit includes the steps of: applying a pressured shearing force to a surface of a backing layer of a tile carpet collected from the market before it is broken, so that at least a part of the backing layer is separated from a fiber assembled layer or from a rest of portion of the backing layer; separating the backing layer and the fiber fabrication layer unit including the fiber assembled layer from the tile carpet from each other; after that, gathering and connecting the tile carpets or the fiber fabrication layer units to each other utilizing heat energy or suitable adhesive, to form a tile shaped block like sheet material or a longitudinal sheet material; and forming various kinds of industrial materials from these sheets.

12 Claims, 13 Drawing Sheets

U.S. PATENT DOCUMENTS

| | | | |
|---|---|---|---|
| 4,822,658 A * | 4/1989 | Pacione | 428/95 |
| 4,988,780 A * | 1/1991 | Das et al. | 525/504 |
| 5,045,375 A * | 9/1991 | Davis et al. | 428/96 |
| 5,360,294 A | 11/1994 | Carriker et al. | |
| 5,585,185 A * | 12/1996 | Smith et al. | 428/411.1 |
| 6,083,596 A * | 7/2000 | Pacione | 428/62 |
| 6,298,624 B1 | 10/2001 | Pacione | |
| 6,395,362 B1 | 5/2002 | Pacione | |
| 6,797,353 B1 | 9/2004 | Pacione | |
| 2001/0042350 A1 | 11/2001 | Pacione | |
| 2007/0204556 A1 | 9/2007 | Pacione | |

FOREIGN PATENT DOCUMENTS

| | | |
|---|---|---|
| FR | 1311684 | 12/1962 |
| JP | 62-134476 | 2/1986 |
| JP | 2000-220282 | 8/2000 |
| JP | 2000-514684 | 11/2000 |
| JP | 2002-191488 | 7/2002 |
| JP | 2002309764 | 10/2002 |
| JP | 2003064857 | 3/2003 |
| WO | 98/03104 | 1/1998 |
| WO | 9803104 | 1/1998 |

* cited by examiner (A)

(B)

(A)

(B)

(A)

(B)

SHEET MATERIAL, A BLOCK LIKE SHEET MATERIAL, A METHOD FOR PRODUCING A SHEET MATERIAL, A METHOD FOR SEPARATING AND RETRIEVING A FIBER FABRICATION LAYER UNIT AND A BACKING LAYER FROM A TILE CARPET

This application is a §371 of PCT/JP2004/006207, filed Apr. 28, 2004.

FIELD OF THE INVENTION

The present invention relates to a sheet material and a method for producing a sheet material and further relates to a method for separating and retrieving a fiber fabrication layer unit and a backing layer from a tile carpet.

More precisely, the present invention further relates to a method for utilizing used tile carpets and a method for separating and retrieving a fiber fabrication layer unit which has once been a carpet portion of a tile carpet and a backing layer including therein a synthetic resin from an used tile carpet.

BACK GROUND OF THE INVENTION

It has been elapsed more than several tens of years since the tile carpets has been widely used in the world and thus a time when such used tile carpets should be replaced with new ones has come now.

On the other hand, it has been gradually become difficult to treat the wastes and especially to waste the products made of vinyl chloride resin has been much more difficult due to a problem of generating so called dioxin.

And accordingly, re-usage of used tile carpets collected from the users thereof, has become a social problem.

In U.S.A., although such used tile carpets are re-used by dying the used tile carpets and applying a new design thereto after the surfaces thereof have been cleaned up, it is still difficult to completely remove soiled portions from a carpet layer of the used carpet which once had been soiled and accordingly, it is a practical way in that the color for dying the used carpets is naturally restricted to dark color.

As a technology for re-using such used tile carpets, for example, Japanese Unexamined Patent Publication (KOKAI) No. 2000-220281 and Japanese Unexamined Patent Publication (KOKAI) No. 2000-220282 disclose technologies, related to a recycling carpets.

These prior art references show a technology whereby a surface decorative resin layer is formed on a front surface or a back surface of a waste material obtained by substantially cutting off a carpet layer from the used tile carpets.

The reason why the carpet layer should substantially be scraped off from the tile carpet, is if the carpet layer was remained on the wasted material, it would be difficult to apply an adhesive or a sticky adhesive to the surface thereof.

Accordingly, in these technologies, it was necessary to substantially cut off the carpet layer from the used tile carpets.

However, as the result thereof, a large amount of fiber dusts has been generated and a separate problem has arisen in that these large amounts of fiber dusts become industrial waste as well as in that the cost for re-using the used tile carpets has been increased due to the necessity of the cutting-off process for cutting the carpet layer from the tile carpet.

Further, a method for separating the carpet layer and the backing layer made of vinyl chloride resin from a used tile carpet is generally used in that a used tile carpet is crushed into fine particles and such particles are separated from each other utilizing a gravity separation method which is disclosed in, for example, Japanese Unexamined Utility Model Publication (KOKAI) No. 59-132581, Japanese Unexamined Utility Model Publication (KOKAI) No. 59-132582, and Japanese Unexamined Patent Publication (KOKAI) No. 8-312117 but this method requires a large amount of energy for crushing the flexible tile carpet in a normal temperature and generates a big noise when the tile carpet is crushed.

In addition to the above-mentioned, it is proposed a method for producing a tile carpet which is provided with a backing layer which can be easily crushed when the backing layer is frozen at a temperature of below minus 30° C., which is shown in Japanese Unexamined Patent Publication (KOKAI) No. 9-173197.

However, it has not been practical way heretofore, since when this method is applied to a tile carpet as already spread out in a market and the backing layer of which being made of a soft vinyl chloride resin, it should be necessary to set a frozen temperature of the tile carpet at an extremely low temperature.

In order to overcome these problems in the past, the inventors of this application have already proposed a new technology which is disclosed in the specification of Japanese Patent Application No. 2002-320421 (which has not yet been opened to public).

This new technology has been successful in re-using the used tile carpets by effectively collecting the backing layer made of vinyl chloride resin.

However, in this technology, a by-product is produced in which a fiber assembled layer which consisting once of a carpet layer of the tile carpet and a fiber fabrication layer unit with a remaining synthetic resin which is a part of the resin once consisting of the backing layer, are integrally formed with each other.

Accordingly, it was a problem to be solved by an invention in that how to effectively utilize the fiber fabrication layer unit corresponding to an integrated small piece of fiber fabrication layer having the same configuration as that of the tile carpet.

DISCLOSURE OF THE INVENTION

Accordingly, an object of the present invention is to provide a method for effectively separating and retrieving the fiber fabrication layer unit which once consisting of the carpet layer and the backing layer including therein a synthetic resin from a tile carpet before the tile carpet is crushed without using a large amount of energy as well as with less noise and less dust particles and also to provide a method to effectively reuse such a fiber fabrication layer unit thus separated and retrieved from the tile carpet.

In order to attain the above-mentioned objects of the present invention, the present invention basically adopts the technical features as shown hereunder.

A first aspect of the present invention is a sheet material which is formed so that a plurality of unit sheet materials are adjacently arranged to each other in two dimensional direction, wherein the unit sheet materials being either one of a tile carpet comprising a fiber assembled layer which is consisting of a carpet layer and a backing layer including a synthetic resin, or a piece of fiber fabrication layer which has a predetermined unit surface area and which comprising a fiber assembled layer having a predetermined thickness with a fiber fixing portion containing therein synthetic resin formed on a part of the fiber assembled layer, and at least on a part of a surface of the fiber fixing portion, a shearing separation treatment surface caused by a shearing separation treating operation being provided (hereinafter referred as a fiber fabrication layer unit).

A second aspect of the present invention is a block like sheet material and a longitudinal sheet material comprising a plurality of the block like sheet materials, wherein the block like sheet material comprising a pair of tile carpets each comprising a fiber assembled layer and a backing layer including a synthetic resin, or a pair of fiber fabrication layer units which having a predetermined unit surface area and which comprising a fiber assembled layer having a predetermined thickness with a fiber fixing portion containing therein synthetic resin formed on a part of the fiber assembled layer, and at least on a part of a surface of the fiber fixing portion, a shearing separation treatment surface caused by a shearing separation treating operation being provided, and further wherein the pair of the tile carpets being connected to each other with each one of the backing layers being oppositely faced with each other or the fiber fabrication layer units being connected to each other with each one of the fiber fixing portions being oppositely faced with each other, and with or without interposing a reinforcing sheet therebetween.

A third aspect of the present invention is a block like sheet material and a longitudinal sheet material comprising a plurality of the block like sheet materials, wherein the block like sheet material comprising a pair of the sheet materials selected from a group of pairs consisting of a pair of tile carpets each comprising a fiber assembled layer and a backing layer including a synthetic resin, a pair of fiber fabrication layer units which having a predetermined unit surface area and which comprising a fiber assembled layer having a predetermined thickness with a fiber fixing portion containing therein synthetic resin formed on a part of the fiber assembled layer, and at least on a part of a surface of the fiber fixing portion, a shearing separation treatment surface caused by a shearing separation treating operation being provided, and a pair of the tile carpet and the fiber fabrication layer unit, and further wherein the backing layer of one of the pair of tile carpets or the fiber fixing portion of one of the pair of fiber fabrication layer units being connected with the fiber assembled layer of either one of the another tile carpet and the another fiber fabrication layer unit in the pair, with or without interposing a reinforcing sheet therebetween.

A fourth aspect of the present invention is a method for separating and retrieving a fiber fabrication layer unit including a fiber assembled layer therein and a backing layer from a tile carpet comprising a fiber assembled layer having a predetermined thickness and a backing layer including a synthetic resin and formed on one of surfaces of the fiber assembled layer, wherein a pressured shearing force is applied to a surface of the backing layer of the tile carpet so that at least a part of the backing layer is separated from the fiber assembled layer or from a rest of portion of the backing layer.

BRIEF DESCRIPTION OF THE DRAWINGS

FIG. 1 is a cross-sectional view for explaining a specific embodiment of an unit sheet material of the present invention and FIG. 1(A) is a cross-sectional view of a construction in one embodiment of a tile carpet before a separation treatment is applied thereto and FIG. 1(B) is a cross-sectional view of a fiber fabrication layer unit to which a shearing separation treatment operation has been applied thereto.

FIG. 2 is a cross-sectional view showing a specific embodiment of a sheet material of the present invention and FIG. 2(A) is a cross-sectional view of a construction in one embodiment of a sheet material utilizing a tile carpet before a shearing separation treatment operation is applied thereto and FIG. 2(B) is a cross-sectional view of one embodiment of a sheet material utilizing a fiber fabrication layer unit to which a shearing separation treatment operation has been applied thereto.

THE BEST MODE FOR CARRYING OUT THE INVENTION

The preferred embodiments of constructions for specific aspects of a sheet material or a block like sheet material concerning the present invention will be explained hereunder with reference to drawings.

Figure 1:
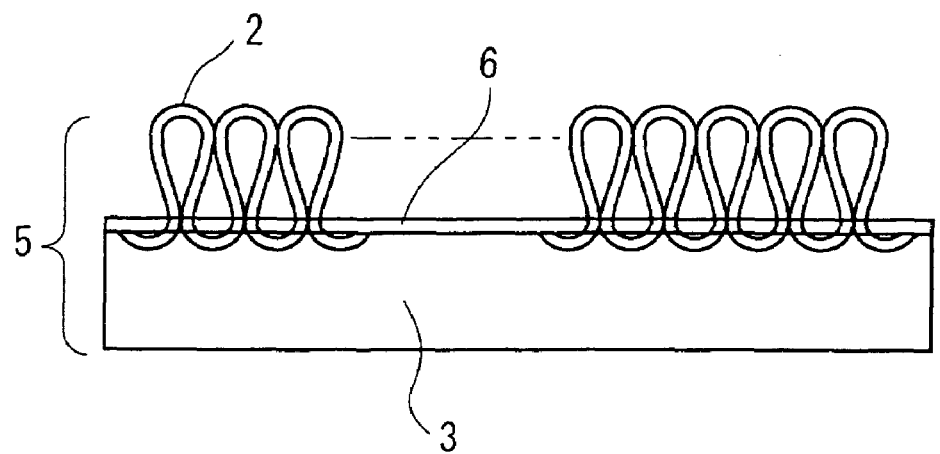
Figure 1:
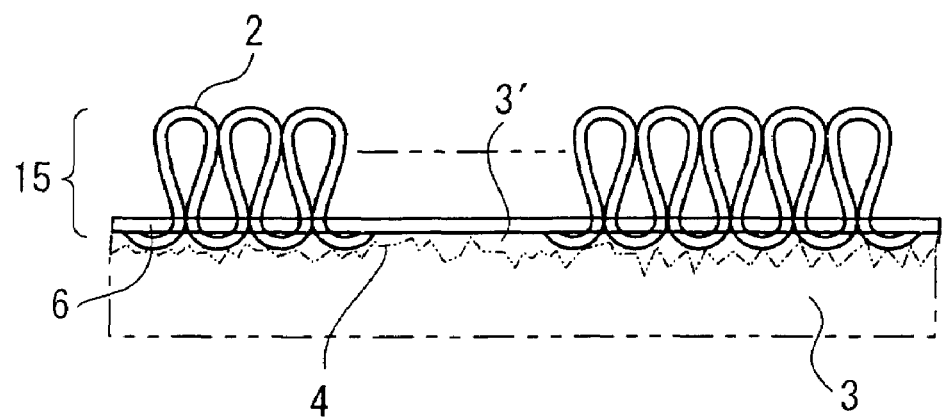

Note that FIG. 1 is a view explaining an outline of a basic construction of a unit sheet like material of the present invention.

In addition, FIG. 1(A) shows a tile carpet 5 comprising a fiber assembled layer 2 having a predetermined thickness and a backing layer 3 which being formed on one of the surfaces of the fiber assembled layer unit 2, and FIG. 1(B) shows a fiber fabrication layer unit 15 which comprises a fiber assembled layer unit 2 having a predetermined thickness with a fiber fixing portion 3' containing therein synthetic resin formed on a back surface of the fiber assembled layer 2, and at least on a part of the back surface of the fiber fixing portion 3', a shearing separation treatment surface 4 caused by a shearing separation treating operation being provided.

The fiber assembled layer 2 used in the present invention, is a layered material which comprises some amount of fiber materials being stacked so as to have a predetermined thickness.

For example, it may be a fiber layer comprising short cut fibers group or a filament fibers group each of which being stacked and being needle-punched or being subjected to a tufting treatment.

And further, for example, the fiber layer may also be a cut pile fiber layer or a loop pile fiber layer in which a plurality of spun yarns or filament yarns are tufted on a desired base fabric 6 and further it also may be a fiber layer comprising a non-woven fabric.

Note that, a tile carpet 5 as used in the present invention, as shown in FIG. 1(A), has a lining sheet, i.e., a backing layer 3 comprising an appropriate synthetic resin, and which is formed on one surface of the base fabric 6 of the fiber assembled layer 2, the surface of which being an opposite surface thereof on which the fiber assembled layer 2 is formed.

On the other hand, although, chemical compositions of the synthetic resin forming the synthetic resin layer i.e., a backing layer 3, are not especially restricted, preferably, it consists of thermoplastic resin and further, it is preferable that the thermoplastic resin may have desired flexibility and resiliency.

A preferred synthetic resin to be used for the synthetic resin layer of the present invention is, for example, vinyl chloride resin.

The vinyl chloride resin can exhaust a function as an adhesive which in a later process, can show thermal plasticity which it is heated.

Note that regarding unit sheet material, a tile carpet 5 which is one of the unit sheet materials, has a basic construction as shown in FIG. 1(A), but by taking into account the object of the present invention in which a fiber fabrication layer unit and a synthetic resin layer that is to say a backing layer are separated and collected from a tile carpet and the synthetic resin layer is supplied to a separate re-producing treatment process, it is also preferable that a fiber fabrication layer unit 15 is used as one of the unit sheet material, and which has a fiber fixing portion 3' made of the synthetic resin which is a part of the backing layer 3 and remaining on a back-surface of a basic fabric 6 consisting of the fiber assembled layer 2, and which is obtained after a large amount of the backing layer 3 was peeled and separated from the fiber assembled layer 2, by applying a shearing separation treatment to the backing layer 3 of the tile carpet 5, as shown in FIG. 1(B).

On a surface of the fiber fixing portion 3' of the fiber fabrication layer unit 15, a shearing separation treatment surface 4 is preferably formed by a shearing separation treatment process as explained later.

Note that, the fiber fixing portion 3' which is formed on the fiber fabrication layer unit 15 and comprising a part of the synthetic resin layer remaining on a surface of the fiber assembled layer 2 when the main portion of the backing layer 3 is separated from the fiber assembled layer 2, by applying the shearing separation treatment to the backing layer 3 such as the synthetic resin layer having a predetermined thickness.

The shearing separation treatment surface 4 of the present invention, as shown in FIG. 1(B), is a surface provided on the synthetic resin layer which is a part of the synthetic resin layer which was once used as a backing layer of the fiber assembled layer 2 and which remaining with a thin film like configuration on a surface of the base fabric 6 on which the fiber assembled layer 2 is not formed, the fiber assembled layer 2 being formed with a large number of loop like pile fibers or cut pile fibers which are formed by desirable yarns planted on the appropriated base fabric 6, or being formed with a several numbers of desired fiber arrangement layers each being stacked one on other with each other on the base fabric 6 and being treated by applying thereto a tufting operation, and the shearing separation treatment surface 4 has a rough surface caused by a lots of numbers of concaved and convex portions arranged irregularly along the surface thereof and each having the respective size each being different from each other.

On the other hand, the tile carpet 5 of the present invention, is preferably a floor covering material which is formed by cutting out from a longitudinal carpet and by trimming with a predetermined dimensions and further, the tile carpet is also preferable that it is an used carpet and which has been collected from a pertinent market as well as use-side.

As the sheet material 1 of the present invention, a longitudinal sheet material can be used in which a plurality of the tile carpets 5 or the fiber fabrication layer units 15, each being one of the unit sheet materials and having predetermined unit length and width, are adjacently arranged with each other, so as to form a matrix like configuration with mutually connecting the opposite side end portions thereof with each other.

Figure 3:
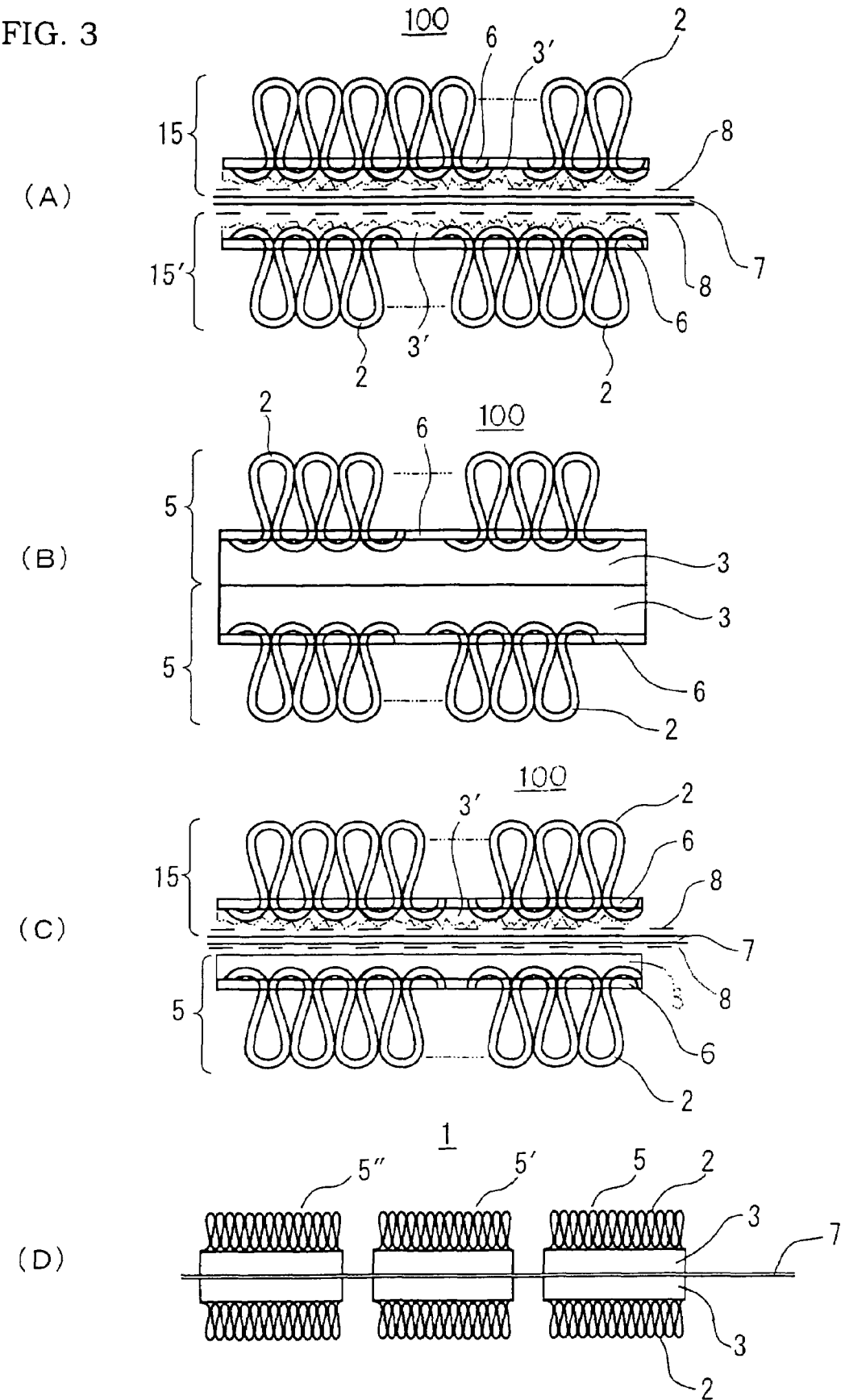
FIG. 3 is a cross-sectional view showing a specific embodiment of a block like sheet material of the present invention.

Further, in the present invention, as a separate aspect for the present invention, for example, as shown in FIG. 3, a block like sheet material 100 can be used in which the block like sheet material 100 comprises a pair of the tile carpets 5 or a pair of fiber fabrication layer units 15 or a pair of a tile carpet 5 and a fiber fabrication layer unit 15, and wherein both of the tile carpets 5 being connected to each other with each one of the backing layers 3 being oppositely faced with each other, or both of the fiber fabrication layer units 15 being connected to each other with each one of the fiber fixing portion 3' being oppositely faced with each other, or the tile carpet 5 and the fiber fabrication layer unit 15 being connected to each other with the backing layers 3 of the tile carpet 5 and the fiber fixing portions 3' of the fiber fabrication layer unit 15 being oppositely faced with each other, with or without interposing a reinforcing sheet 7 therebetween.

Note that, in the present invention, the unit sheet material refers either one of a tile carpet 5 having a predetermined unit surface area as mentioned above or the fiber fabrication layer unit 15 obtained by separating it from a tile carpet 5 having a predetermined unit surface area as mentioned above.

Further, the sheet material as used in the present invention, includes a longitudinal sheet material which has been formed by adjacently arranging a plurality of the unit sheet materials mutually to each other in two dimensional directions.

On the other hand, the block like sheet material as used in the present invention, is a constructional member which has a two-layered configuration in which at least two unit sheet materials being mutually stacked with each other and has a rectangular configuration with a unit surface area similar to that of a tile carpet 5.

Further, the longitudinal sheet like material 1 and the block like sheet material 100 of the present invention can be used as either one of the following industrial sheets such as a foundation sheet including a water proofing sheet, an impervious sheet and a protection sheet; a floor covering sheet, a tile carpet used outdoors, a protection sheet used for a roof-top garden.

Further in the present invention, it is also preferable that the sheet material 1 as shown in FIG. 2(A), comprises the tile carpets 5 and an appropriate reinforcing sheet 7.

And the sheet material 1 of the present invention, as shown in FIG. 2(B), it is also preferable that the reinforcing sheet 7 is arranged so as to be stacked on the shearing separation treatment surface 4 of the fiber fixing portion 3' of the fiber fabrication layer unit 15.

The reinforcing sheet 7 as used in the present invention, preferably has water-proofing characteristic and it is also preferable that the reinforcing sheet 7 is made by one of sheet materials selected from a group consisting of a woven fabric, knitted fabric, a non-woven fabric, a Victoria lawn, a fabric made of either one of the a woven fabric, knitted fabric, a non-woven fabric or a Victoria lawn being laminated with desired resin film, a plastic film sheet and a porous plastic film sheet material.

In addition, it is preferable that the backing layer 3 or the fiber fixing portion 3' of the present invention and the reinforcing sheet 7 are connected with each other via appropriate adhesive 8 or both of them are connected with each other via the fiber fixing portion 3' functioning as the adhesive.

As an embodiment of the block like sheet material 100 of the present invention, as shown in FIG. 3(A), it may have a configuration in that a plurality of fiber fabrication layer units 15 are connected to each other with each one of the fiber fixing portions 3' thereof, each having a shearing separation treatment surface 4, being oppositely faced with each other, with or without interposing a reinforcing sheet therebetween.

Note that, in the specific embodiment of the present invention, the respective fiber fixing portions 3' of each one of the fiber fabrication layer unit 15 as shown in FIG. 1(B) are mutually and oppositely connected with each other.

Further note that, the block sheet material 100 of the present invention is characterized in that the fiber assembled layers 2 are provided on both surfaces of the fiber fixing portions 3' connected with each other with or without interposing the reinforcing sheet 7 between both fiber fixing portions 3'.

On the other hand, as a separate embodiment of the block like sheet material 100 of the present invention, as shown in FIG. 3(B), it may have a configuration in that a plurality of tile carpets 5 as shown in FIG. 1(A), are connected with each other, with each one of the backing layers 3, each of which having no such shearing separation treatment surface 4, being oppositely faced with each other, and with or without interposing a reinforcing sheet therebetween.

Further, as a further embodiment of the block like sheet material 100 of the present invention, it may have a configuration in that, as shown in FIG. 3(C), a tile carpet 5 comprising a backing layer 3 without having the shearing separation treatment surface 4 and a fiber fabrication layer unit 15 comprising a fiber fixing portion 3' with having the shearing separation treatment surface 4 are connected to each other with the backing layer 3 and the fiber fixing portion 3' being oppositely faced with each other with or without interposing a reinforcing sheet 7 therebetween.

The longitudinal sheet material 1 of the present invention, can be formed by adjacently arranging a plurality of unit sheet materials such as the tile carpets 5 or the fiber fabrication layer units 15 serving as a basic unit, each having a predetermined length and width, to each other in two dimensional direction, as shown in FIGS. 4(A) to 4(C), and the side end portions 11 of each one of the unit sheet materials which are contacting with each other, are fixedly connected to each other with a desired adhesive.

Or in another aspect thereof, it can also be formed in a way such as when a plurality of the unit sheet materials 5 or 15 are adjacently arranged to each other in two dimensional directions and connected with each other, at least apart of the unit sheet materials 5 or 15 which being mutually and adjacently arranged to each other, are overlapped 10 with each other and such mutually overlapped portions 10 are fixedly connected to each other by utilizing a desired adhesive or by applying thereto thermal melting treatment or by applying a seeming treatment with utilizing a desired sewing yarn 12.

Figure 4:
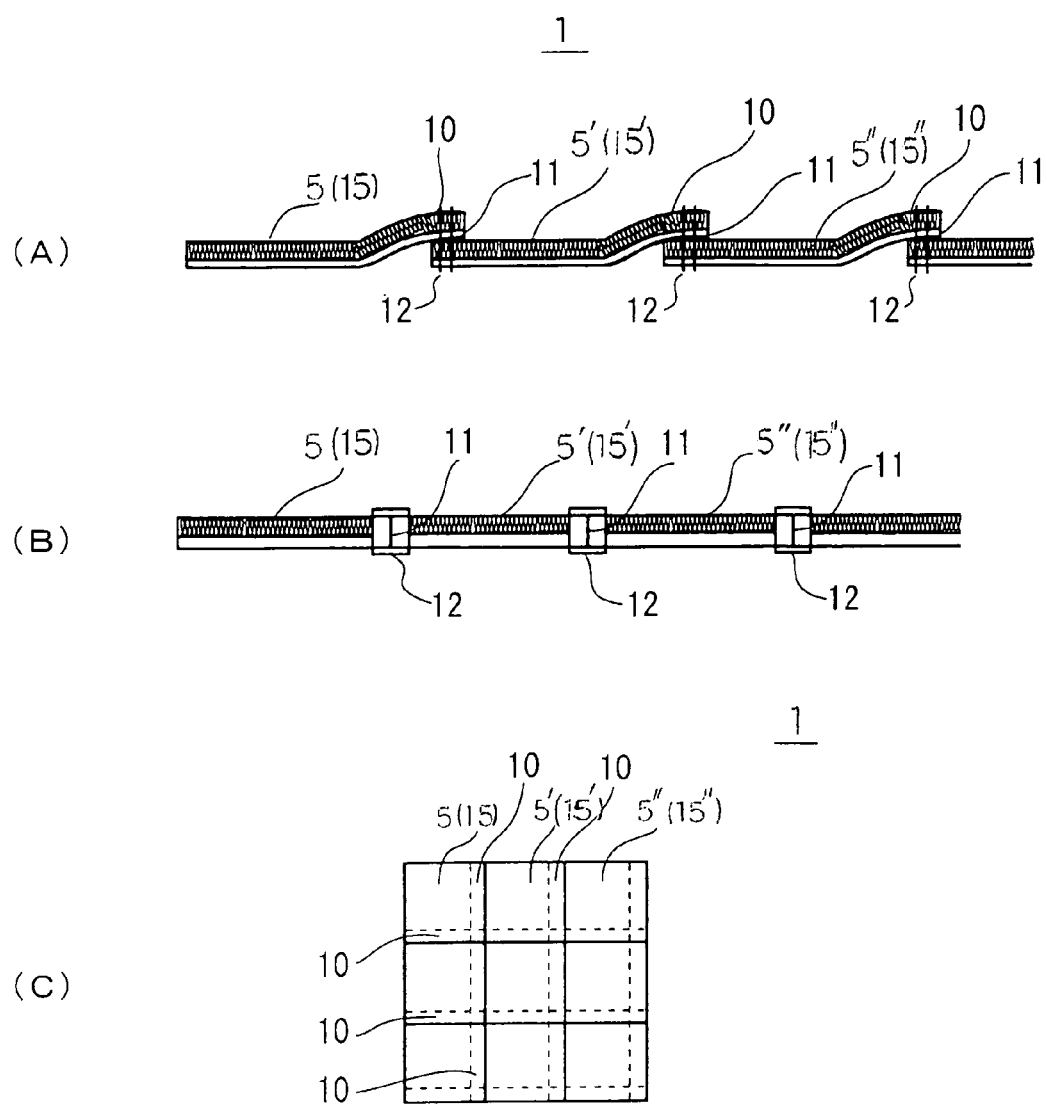
FIGS. 4(A) to 4(C) are views illustrating a specific embodiment of the present invention in which a plurality of tile carpets or plurality of fiber fabrication layer units are connected to each other to form a sheet material.

As the sheet material 1 as shown in FIG. 4, it is also preferable that a desired reinforcing sheet 7 may be attached to a back surface of the sheet material 1 (not shown).

Or, in one embodiment of the sheet material of the present invention, on both of a front surface and a back surface of the sheet material 1, the fiber assembled layers 2 are provided.

Figure 5:
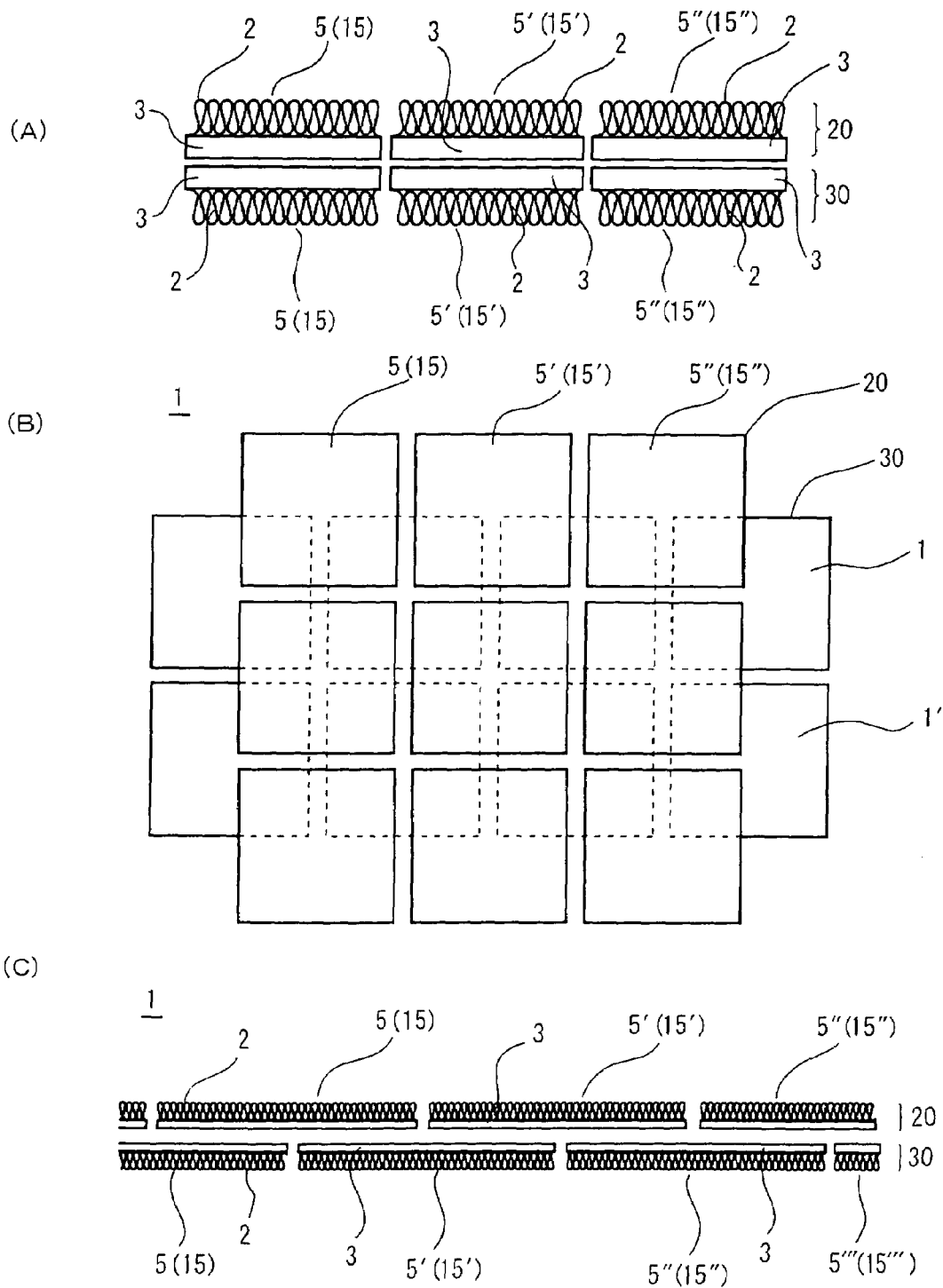
FIGS. 5(A) to 5(C) are views illustrating another specific embodiments of the present invention in which a plurality of tile carpets or plurality of fiber fabrication layer units are connected to each other to form a sheet material.

As shown in FIG. 5(A), it is also possible in the present invention, that a longitudinal sheet like material can be configured in that a first and a second longitudinal sheet materials 20 and 30 are prepared, wherein both of the first and second longitudinal sheet materials are formed respectively, in such a way that a plurality of unit sheet materials 5 or 15 are adjacently arranged and contacted to each other in two dimensional directions so that the fiber assembled layers 2 of each one of the unit sheet material 5 or 15 consist of a same surface or in addition thereto at least a part of the unit sheet materials 5 or 15 are overlapped with each other, and then the first and the second longitudinal sheet materials 20 and 30 are connected with each other so that the backing layers 3 or the fiber fixing portion 3' of each one of the first and the second longitudinal sheet materials 20 and 30 are mutually opposed to each other.

On the other hand, as shown in FIGS. 5(B) and 5(C), it is also possible to produce the longitudinal sheet material that at a time when the first and second longitudinal sheet materials 20 and 30 is formed in a way that a plurality of the unit sheet materials 5 or 15 are adjacently arranged and contacted to each other in two dimensional directions so that the fiber assembled layers of each one of the unit sheet materials 5 or 15, forms a same front surface of the resulted sheet material, or in addition thereto at least a part of the unit sheet materials 5 or 15 are overlapped with each other, and then the first and the second longitudinal sheet materials 20 and 30 are connected with each other so that the backing layers 3 or the fiber fixing portion 3' of each one of the first and the second longitudinal sheet materials 20 and 30 are mutually opposed to each other, both of the first and the second longitudinal sheet materials 20 and 30 are connected to each other in such a way in that the connecting lines or the overlapping lines formed among a plurality of unit sheet materials each being adjacently arranged to each other in the first longitudinal sheet material, is displaced from the connecting lines and the overlapping lines formed among a plurality of unit sheet materials each being adjacently arranged to each other in the second longitudinal sheet material.

Further, as shown in FIG. 3(D), the longitudinal sheet material can also be a sheet material which is formed to have a longitudinal configuration by connecting a plurality of the backing layers 3 of the tile carpet 5 which is one of the unit sheet materials, to both surfaces of a desired longitudinal reinforcing sheet 7 with or without utilizing desired adhesive.

Note that, the block like sheet material as indicated in either one of FIGS. 3(A) to 3(C), can be used as a new type of tile carpet since this block like sheet material is provided with the fiber assembled layers 2 including a lots of loop piles therein on both surfaces thereof.

Note that, a conventional tile carpet is provided with a backing layer corresponding to a lining layer made of vinyl chloride resin and when this kind of tile carpet provided with the lining layer made of vinyl chloride resin, is used for covering a floor inside a house a double surfaced adhesive tape is frequently used.

However, some plastisizers being mixed into the vinyl chloride resin bleed out (bleeding means that the plastisizers mixed into the vinyl chloride resin to soften the vinyl chloride resin, are bled out and transferred into another substance contacting the vinyl chloride resin and this is a phenomena which can be seen in a gum or the like), and thus the adhesive tape becomes sloppy or sticky so as not to be attached.

Accordingly, if the fiber assembled layers including therein a lot of loop piles is provided on a back surface of the tile carpet, a surface fastener can be used when it is arranged on a surface of the floor and thus installing work will become easy, reducing a situation in which the tile carpets are positively used inside homes, improved.

Figure 6:
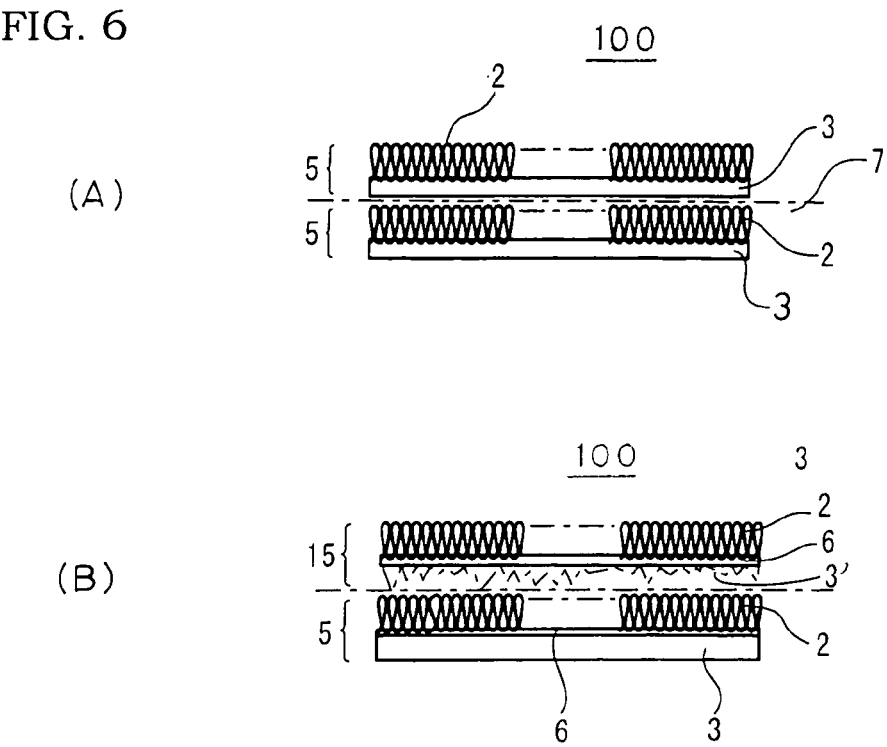
FIGS. 6(A) to 6(B) are cross-sectional views showing another specific embodiments of block like sheet materials of the present invention.

As an another different embodiment of the block like sheet materials 100 or the longitudinal sheet materials 1 which is formed by adjacently arranging a plurality of the block like sheet materials 100 of the present invention, for example, as shown in FIG. 6, the block like sheet materials 100 may basically have the configuration in that the sheet materials 100 which comprise a pair of the sheet materials selected from a group of pairs consisting of a pair of tile carpets 5 each comprising a fiber assembled layer 2 and a backing layer 3 including a synthetic resin, a pair of fiber fabrication layer units 15 which have a predetermined unit surface area and which comprise a fiber assembled layer 2 having a predetermined thickness with a fiber fixing portion 3' containing therein synthetic resin formed on a part of the fiber assembled layer 2, and at least on a part of a surface of said fiber fixing portion 3', a shearing separation treatment surface 4 caused by a shearing separation treating operation being provided, and a pair of the tile carpet 5 and the fiber fabrication layer unit 15, and further wherein the backing layer 3 or the fiber fixing portion 3' of the tile carpets 5 or the fiber fabrication layer units 15 in one side of the pair is connected with the fiber assembled layer 2 of either one of the tile carpet 5 and the fiber fabrication layer unit 15 in another side of the pair, with or without interposing a reinforcing sheet 7 therebetween.

Note that, FIG. 6(A) shows an embodiment of a block like sheet material 100 in which two tile carpets 5 as the unit sheet materials are mutually connected to each other in such a way that the backing layer 3 of the tile carpet 5 in one side of the pair is connected to the fiber assembled layer 2 of the tile carpet 5 in another side of the pair with interposing an appropriate adhesive therebetween.

And it is possible to interpose a desired reinforcing sheet 7 between the backing layer 3 and the fiber assembled layer 2, if necessary.

Further, FIG. 6(B) shows an embodiment of a block like sheet material 100 of the present invention in which when a tile carpet 5 as used for one unit sheet material as one side of a pair and a fiber fabrication layer unit 15 as used for another unit sheet material as another side of the pair, are mutually stacked to each other in one on other, the fiber fixing portion 3' of the fiber fabrication layer unit 15 in one side of the pair, is connected to the fiber assembled layer 2 of the tile carpet 5 in another side of the pair, to form a block like sheet material 100 with interposing an appropriate adhesive layer therebetween.

And further, between the fiber fixing portion 3' and the fiber assembled layer 2, it is possible to interpose a suitable reinforcing sheet 7, depending upon the necessity thereof.

In this embodiment, it is also possible in that two pair of the fiber fabrication layer units 15 are mutually stacked with each other in the same manner as shown in FIG. 6(A).

In these embodiments, a sheet material having significant cushion characteristic, anti-seismic characteristic or seismic-isolation characteristic can be obtained by the sheet material 1 and the block like sheet material 100.

Figure 7:
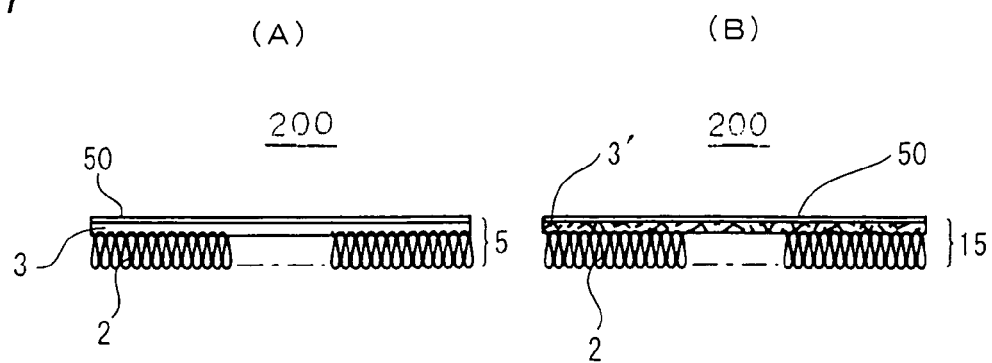
FIGS. 7(A) to 7(B) are cross-sectional views showing specific embodiments of flooring materials of the present invention.

Further, in a separate embodiment from those as mentioned above, as shown in FIG. 7, a flooring material 200 is provided, wherein the floor covering material 200 comprises a tile carpet 5 comprising a fiber assembled layer 2 and a backing layer 3 including a synthetic resin, or a fiber fabrication layer unit 15 which has a predetermined unit surface area and which comprising a fiber assembled layer 2 having a predetermined thickness with a fiber fixing portion 3' containing therein synthetic resin formed on a part of the fiber assembled layer 2, and at least on a part of a surface of the fiber fixing portion 3', a shearing separation treatment surface 4 caused by a shearing separation treating operation being provided, and the a floor covering layer 50 including therein a synthetic resin which is different from that of the backing layer 3 or fiber fixing portion 3', is formed on a surface either one of the backing layer 3 or the fiber fixing portion 3'.

The floor-covering layer 50 as used in this embodiment, is preferably a layered material made of a desired synthetic resin with an appropriate hardness and which has a smooth and flat surface so as to exhaust a suitable function as a floor tile.

Note that, FIG. 7(A) shows an embodiment of the flooring material 200 in which a floor-covering layer 50 is provided on the backing layer 3 of a tile carpet 5 as an unit sheet material and in this embodiment, a pre-fabricated floor-covering layer 50 can be connected to the backing layer 3 via a suitable adhesive or it can be directly formed on the backing layer 3 with utilizing a suitable film forming technology.

On the other hand, FIG. 7(B) shows a further separate embodiment in which a floor-covering layer 50 is provided on the fiber fixing portion 3' of the fiber fabrication layer unit 15 as an unit sheet material and in this embodiment, a pre-fabricated floor-covering layer 50 can be connected to the fiber fabrication layer unit 3' via a suitable adhesive or it can be directly formed on the fiber fixing portion 3' with utilizing a suitable film forming technology.

In these embodiments, a sheet material having a high cushion characteristic can be obtained by the sheet material 1 or the block like sheet material 100, and simultaneously, it can be arranged and attached detachably on a floor with utilizing a hook-and-loop fastener or a double faced adhesive tape or the like.

Figure 15:
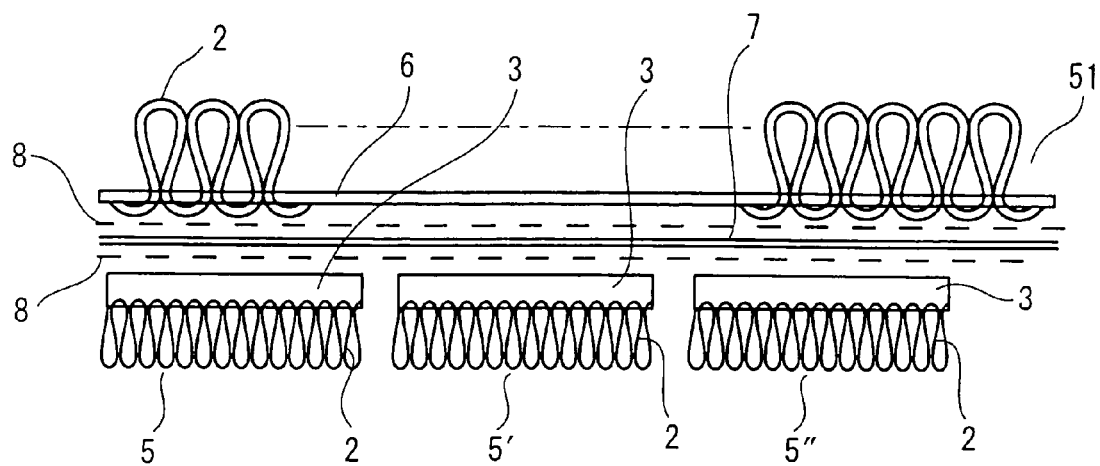
FIGS. 15(A) to 15(B) are cross-sectional views showing construction of other embodiment of the block like sheet material of the present invention.
Figure 15:
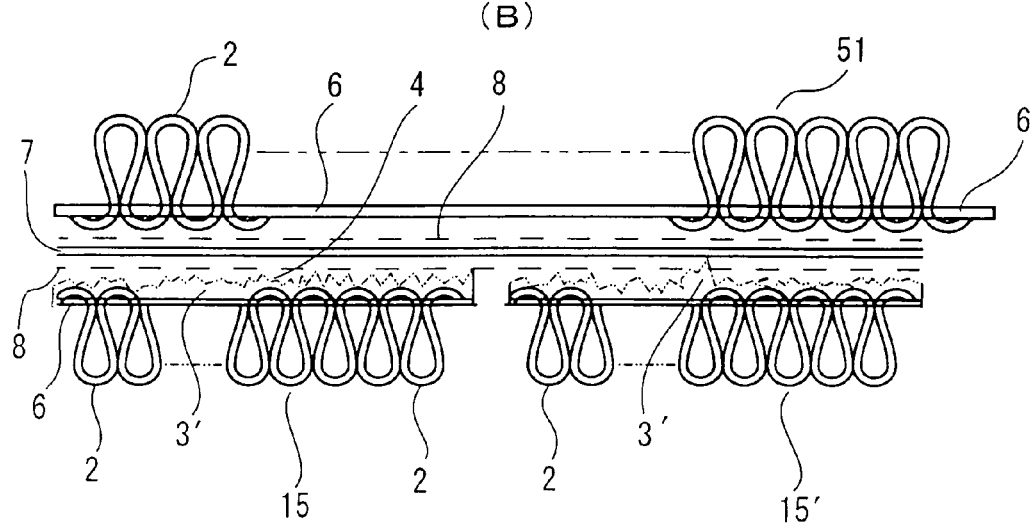

Hereafter, further different embodiment of the present invention will be explained with reference to FIG. 15.

Note that, in this embodiment, the present invention provides a tile carpet which is cut out from a composite longitudinal sheet material and trimmed to have a configuration of a tile carpet, and the sheet material of which comprises a longitudinal sheet material 1 and a longitudinal raw carpet material 51 and wherein a base fabric 6 of the longitudinal raw carpet material 51 and a backing layer 3 or a fiber fixing portion 3' of the longitudinal sheet material 1 are oppositely contacted to each other with or without interposing a reinforcing sheet therebetween.

Therefore, the tile carpet has the fiber assembled layer 2 on both side surfaces thereof.

In this embodiment, although a fresh raw carpet material 51 can be used, the used tile carpets are re-used as a backing materials for this raw carpet material, and thus this embodiment effectively contributes to reduction of industrial waste.

Further, it is also possible that this kind of tile carpet can be arranged and attached to floors using "Magic Tape" (Registered Trademark), i.e., one kind of the hook-and-loop fastener.

Note that the raw carpet material 51 as used in the present invention, includes the following products;

That is, in this embodiment, the raw carpet material 51 means a carpet layer having a wide width and longitudinal configuration and which should be supplied to a carpet making process, and having a loop like carpet layer formed by tufting yarns on a base fabric to form the loop piled carpet layer or which having a cut pile like carpet layer formed by cutting a tip end portion of the loop like pile yarns of the loop piled carpet layer so as to form a cut pile like carpet layer.

The sheet material 1 or the block like sheet material 100 of the present invention, can be used as the different kinds of industrial material sheets and more specifically, it can be used, for example, as a sheet selected from a group of sheets consisting of an under layer including a water proofing sheet, an impervious sheet and a protection sheet; a floor covering sheet, a tile carpet used in outdoor, a covering sheet used for roof garden.

A specific embodiment of the sheet material of the present invention is further explained more precisely.

For example, the sheet material of the present invention has the following configuration; such as (1) A sheet material or a block like sheet material which has a plate like material provided with fiber assembled layers on both surfaces thereof, which can be obtained by cutting out from a source sheet material and by being trimmed to have a predetermined dimensions, depending upon its necessity, and wherein the source sheet material is formed by the following method.

Such as, in utilizing either one of a pair of fiber fabrication layer units obtained from a used tile carpet by a separating and collecting operation, a pair of tile carpets or a pair of a tile carpet and a fiber fabrication layer unit, the pair of the tile carpets or the pair of the fiber fabrication layer units are respectively connected to each other with each one of the backing layers of the tile carpets or the fiber fixing portions of the fiber fabrication layer units being oppositely faced with each other utilizing heat energy or a desired adhesive and these tile carpets or fiber fabrication layer units being adjacently arranged to each other with or without interposing a reinforcing sheet made by a non-woven fabric with wide width or a Victoria lawn or a plastic sheet therebetween, or the tile carpet and the fiber fabrication layer unit are connected to each other with the fiber assembled layers of the tile carpet and the fiber fabrication layer unit being arranged on external surface of the sheet material and a plurality of this pairs being adjacently arranged to each other with or without interposing the reinforcing sheet, therebetween.

(2) A sheet material having a longitudinal configuration and provided with fiber assembled layers on both surfaces thereof, which can be obtained by cutting out from a source sheet material with a predetermined dimensions, and wherein the source sheet material is formed by the following method.

Such as, in utilizing either one of collected used tile carpets or fiber fabrication layer units obtained by separating from the collected used tile carpets, or both, when they are contacted to each other with heat energy or a desired adhesive, so that a loop like layer or a pile like layer of each one of the fiber assembled layers of the tile carpets or the fiber fabrication layer units are provided on both surfaces of the final sheet material and these tile carpets or fiber fabrication layer units being adjacently arranged to each other with or without interposing a reinforcing sheet made by a non-woven fabric with wide width or a Victoria lawn or a plastic sheet, therebetween, they are connected in such a way that the connecting lines or the overlapping lines formed among a plurality of the tile carpets or the fiber fabrication layer units arranged on one side of the sheet material is or is not displaced from the connecting lines or the overlapping lines formed among a plurality of the tile carpets or the fiber fabrication layer units each being adjacently arranged to each other on the opposite side thereof.

(3) The sheet material as mentioned above can be used as a water proofing sheet, an impervious sheet, a protection sheet, a floor covering sheet, a tile carpet used outdoor (walk on without taking off one's footgear), a protection sheet used for a roof garden, or a normal protection sheet for a water proofing sheet or an impervious sheet.

Note that the sheet materials of the present invention can also be used for various kinds of under layers such as, for example, a water proofing sheet, an impervious sheet and a protection sheet as used for an industrial waste treatment facility or the like as well as can be used as an under layer of the above-mentioned respective sheets.

On the other hand, it can be also used for a water proofing sheet, or an impervious sheet for soft foundation area or can be used for an foundation sheet or a protection sheet thereof.

In addition, it can be also used as a protection sheet to prevent a water proofing sheet or an impervious sheet from been damaged by a shovel or a plow when soil is arranged on a top surface of a building when a roof-top garden is designed on a roof of a building.

Further, it can be used as a tile carpet or a floor covering sheet which has a loop like layer on a back surface thereof which is formed by cutting out from a sheet material and trimmed with a desired dimensions, wherein the sheet material is produced by contacting a collected used tile carpet to a back surface of a tile carpet or a floor covering sheet utilizing heat energy or a desired adhesive with or without interposing a non-woven fabric or a plastic sheet having wide width, therebetween, so that the fiber assembled layers of the tile carpet are faced to outside of the sheet material.

Hereunder, a method for producing a fiber fabrication layer unit by separating the same from a tile carpet of the present invention will be explained.

Note that, firstly, one embodiment of a method for producing a fiber fabrication layer unit 15 which has a fiber fixing portion 3' including therein a synthetic resin with having a shearing separation treatment surface 4 as used in the present invention will be explained.

Note that, the method of the present invention is the one for producing a fiber fabrication layer unit having a fiber assembled layer 2 which was once a carpet layer and a fiber fixing portion 3' with a shearing separation treatment surface 4 and the method comprising a step of applying a pressured shearing force to a external surface of the backing layer 3 of the tile carpet comprising a fiber assembled layer 2 having a predetermined thickness and to form a carpet layer and a backing layer 3 including a synthetic resin, so that at least a part of the backing layer 3 is separated from the fiber assembled layer 2 of the tile carpet 5.

The method for producing the fiber fabrication layer unit 15 of the present invention will be more precisely explained, hereunder. The method for producing the fiber fabrication layer unit 15 of the present invention is comprising the steps of;

setting a gap formed between a pair of rollers, a rotational speed of one of the rollers in the pair being set at a rotational speed with 1.2 to 5 times faster than that of another roller in the pair, with a distance less than a thickness of the backing layer of the tile carpet 5, heating the tile carpet 5 at a temperature within 90 to 190° C., feeding the heated tile carpet 5 through the gap of the pair of rollers so that the backing layer 3 of the tile carpet 5 is contacted with one of the rollers 22 of the pair the rotational speed of which being faster than that of another roller in the pair, and causing a deformation at boundary phase formed between the backing layer 3 and the fiber assembled layer 2 of the tile carpet 5 or among the inter-layers within the backing layer 3 so that at least a part of the backing layer 3 is separated from the fiber assembled layer 2 or from a part of the backing layer 3 which being still connected to the fiber assembled layer 2.

Figure 8:
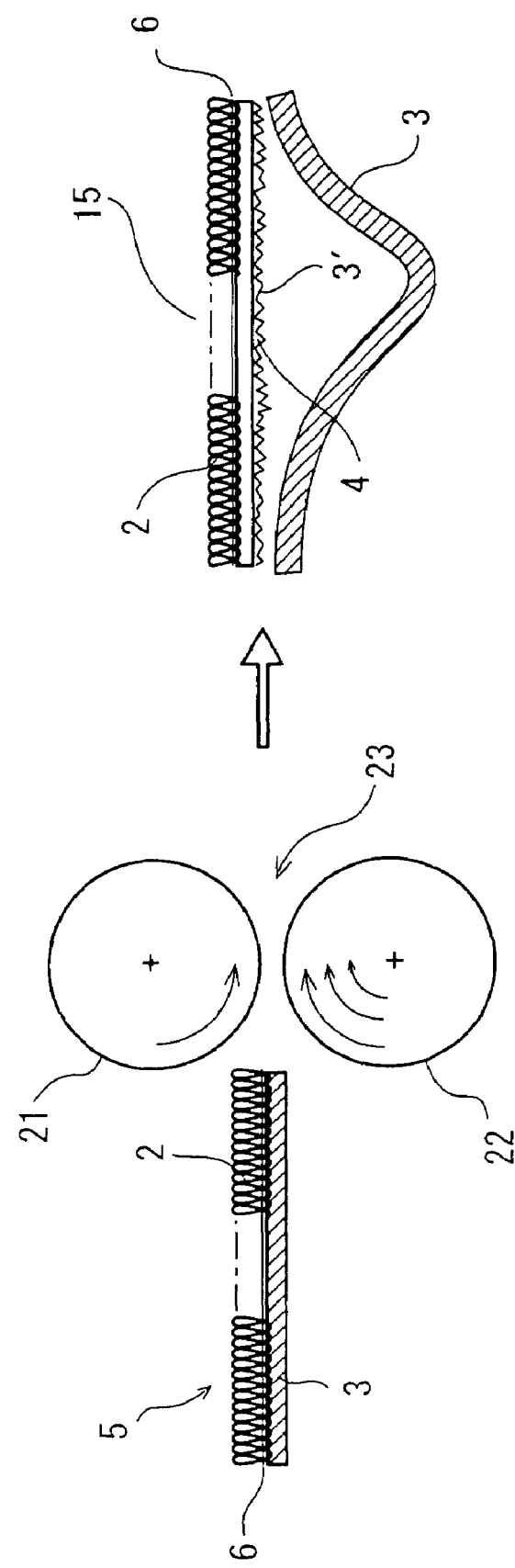
FIG. 8 is a view explaining a principal method for separating the fiber fabrication layer unit and the backing layer from a tile carpet, in the present invention.

The method for producing the fiber fabrication layer unit 15 is explained more precisely with reference to FIG. 8.

Note that, the method of the present invention is a method for producing a fiber fabrication layer unit 15 which having the fiber fixing portion 3' with having a shearing separation treatment surface 4, as shown in FIG. 8, wherein that the method comprising a step of applying a pressured shearing force to a external surface of the backing layer 3 of the tile carpet 5 comprising a fiber assembled layer 2 having a predetermined thickness and a backing layer 3 formed on one of the surfaces of the fiber assembled layer 2 and having a predetermined thickness, so that at least a part of the backing layer 3 is separated from the fiber assembled layer 2 of the tile carpet 5.

And the method comprises the steps of;

setting a gap 23 formed between a pair of rollers 21, 22, a rotational speed of one of the rollers in the pair being set at a rotational speed with 1.2 to 5 times faster than that of another roller in the pair, with a distance being less than a thickness of the backing layer 3 of the tile carpet 5, heating the tile carpet 5 at a temperature within 90 to 190° C., feeding the heated tile carpet 5 through the gap of the pair of rollers 21, 22 so that the backing layer 3 of the tile carpet 5 is contacted with one of the rollers 22 of the pair the rotational speed of which being faster than that of another roller in the pair, and causing a deformation at boundary phase formed between the backing layer 3 and the fiber assembled layer 2 of the tile carpet 5 or among the inter-layers within the backing layer 3 so that at least a part of the backing layer 3 is separated from the fiber assembled layer 2 or from a fiber fixing portion 3' which is a part of the backing layer 3 which being still connected to the fiber assembled layer 2.

In other words, by operating the shearing separation treatment, the most part of the backing layer 3 will be separated from the fiber assembled layer 2, but a part of the backing layer 3 will remain on the back surface of the fiber assembled layer 2 with a condition in that some part of the backing layer 3 still contacts a back surface of a base fabric 6 of the fiber assembled layer 2.

This portion makes the fiber fixing portion 3' and thus the fiber fixing portion 3' has a shearing separation treatment surface 4.

Note that the fiber assembled layer 2 of the tile carpet 5 which is used in the present invention, is formed by a fiber layer having a predetermined thickness arranged on a suitable base fabric 6 or by a plurality of cut piles or loop piles having a predetermined length and being tufted on the suitable basic fabric.

On the other hand, the fiber fixing portion 3' is formed when a part of the backing layer 3 is remained on an opposite surface of the basic fabric 6 to form a lining sheet or backing sheet of the fiber assembled layer 2.

And further, by carrying out the shearing separation treatment, in a case may be, all of the backing layer 3 would be completely removed from the back surface of the fiber assembled layer 2, i.e., from a surface of the basic fabric 6, but in many cases, a part of the backing layer would be remained on the back surface of the fiber assembled layer 2 and thus the shearing separation treatment surface 4 will be formed on a surface of the partly remained backing layer.

As a backing layer 3 of the present invention, when vinyl chloride resin is used, for example, the heating temperature of the tile carpet 5 is preferably 90 to 190° C.

Hereunder, a specific embodiment of the method for producing the sheet material 1 of the present invention will be explained.

Note that, the method for producing the sheet material 1 of the present invention is basically a method for producing a sheet material having a fiber assembled layer 2 provided on both surfaces of the sheet material, wherein in using a pair of tile carpets each comprising a fiber assembled layer 2 and a backing layer 3 including a synthetic resin, a pair of fiber fabrication layer units 15 which having a predetermined unit surface area and which comprising a fiber assembled layer 2 having a predetermined thickness with a fiber fixing portion 3' containing therein synthetic resin formed on a part of the fiber assembled layer, and at least on a part of a surface of the fiber fixing portion 3', a shearing separation treatment surface 4 being provided at least on a part of the fiber fixing portion 3', or a pair of the tile carpet 5 and the fiber fabrication layer unit 15, both of the backing layers 3 of the pair, both of the fiber fixing portions 3' of the pair or the backing layer 3 and the fiber fixing portion 3' of the pair are oppositely and mutually connected with each other with or without interposing a reinforcing sheet 7 therebetween.

For example, when a block like sheet material 100 as shown in FIG. 3(C), is produced, as an embodiment of a method for producing the same, for example, it is preferable that a backing layer 3 of a normal tile carpet 5 and a fiber fixing portion 3' of the fiber fabrication layer unit 15 are oppositely arranged to each other and contacted to each other with or without interposing a reinforcing sheet 7 therebetween.

And thereby a block like sheet material 100 in which on both of the surfaces of the connected portion formed between the backing layer 3 and the fiber fixing portion 3', the fiber assembled layer 2 are provided.

Hereunder, another embodiment for producing the sheet material 1 of the present invention will be more precisely explained.

Note that, a tile carpet 5 as used in the present invention denotes a floor covering sheet comprising two layered configuration made of a fiber assembled layer 2 normally mentioned as a carpet layer and a backing layer 3 made by vinyl chloride resin as used for a lining sheet, for example, a floor covering sheet material, but not including a bitumen backing or gum backing or the like.

The fiber assembled layer 2 as used in the present invention, is a fiber assembled body in which a plurality of fibers are assembled to form a carpet layer of a tile carpet 5, while the fiber fabrication layer unit 15 comprises such a fiber assembled layer 2 therein, a group of fibers of which being kept by a base fabric 6 and on a surface of the base fabric 6 which is the surface being different from the surface of the base fabric 6 on which the fiber assembled layer 2 is formed, a fiber fixing portion 3' is provided wherein the fiber fixing portion 3' comprises a remained portion of the backing layer 3 which are remained thereon after the most part of the backing layer 3 which is a lining sheet and made of vinyl chloride resin, has been removed from the tile carpet 5 and which fixedly secures the group of fibers to the base fabric 6.

In the present invention, it is necessary to heat the tile carpet to be treated at temperature of 90 to 190° C. and preferably at temperature of 140 to 185° C.

When the tile carpet is heated at temperature of less than 90° C., the separating operation can not be carried out smoothly, while when it is heated at temperature exceeding 200° C., vinyl chloride resin backing layer will be discomposed or the fiber assembled layer 2 will start to be melted thus these facts causes the separation process to be difficult and will give the recycle process disadvantage.

In the present invention, the heating temperature of the tile carpet 5 is measured on a surface of the backing layer 3 which is a lining sheet made of vinyl chloride resin with a contact-less thermometer or the like.

As a method for heating the tile carpet 5, there are available a method for blowing heated air to the backing layer 3, a method for moving the same through a heating furnace, a method for moving the same through infra-red heating equipment, a method for moving the same over a heated plate, a method for winding the same on a heated roller, a method for subjecting the same with ultra-sonic heating, a method for subjecting the same with dielectric heating, or a method for subjecting the same with high frequency heating or the like.

Since a surface of the fiber assembled layer of the collected used carpets or used tile carpets are soiled, a method for spraying steam to the carpets in cooperation with a cleaning process is also available.

In this method, although the higher the temperature of the steam is the more effective result can be obtained, the temperature of 110 to 160° C. of the steam is more operational.

The object of the heated tile carpet 5 being moved through a gap 23 formed between a pair of rollers 21 and 22 is such that the weakest composition among the backing layer of the tile carpet 5, is broken to cause the separation between the backing layer and the fiber assembled layer.

Accordingly, in order to generate displacements within adjacent layers at a boundary phase formed between the fiber assembled layer 2 and the backing layer 3 which is a lining sheet material made of vinyl chloride resin, it is necessary to set a difference in rotational speed between a pair of the rollers 21 and 22.

And in the present invention, it is preferable that the difference in rotational speed between a pair of the rollers 21 and 22 is set at 1.2 to 5 times, and more preferably, the difference thereof is set at 2 to 5 times.

Further, when the heated tile carpet 5 is moved through the gap 23 formed between the pair of rollers 21 and 22, it is essential that the backing layer 3 which is a lining sheet material made of vinyl chloride resin should be contacted with the roller 22 the rotational speed of which being faster than that of the roller 21.

When the tile carpet 5 is moved through the rollers with a reversed condition, the separation becomes difficult.

As the same way, the gap 23 formed between the pair of rollers 21 and 22 should be set at a distance less than the thickness of the backing layer of the tile carpet in order to generate such displacement among adjacently arranged layers in the boundary phase formed between the fiber assembled layer 2 and the backing layer 3.

When the gap 23 of the pair of rollers 21 and 22 exceeds the thickness of the tile carpet 5, the tile carpet 5 will fall down with slip and it will be difficult to cause such displacement among the adjacently arranged layers at the boundary phase formed between the fiber assembled layer 2 and the backing layer 3 which is a lining sheet material made of vinyl chloride resin.

By using the method of the present invention as mentioned above, the fiber fabrication layer unit 15 and the backing layer 3 can be separated from the tile carpet 5.

In the present invention, a value of the puncture resistance is a standard value representing strength of a geotextile adopted by Japan Impervious System Association, which is also used as a standard value in U.S.A. as ASTM 488332.

And the puncture resistance value represents a force measured when an iron rod having a diameter of 8 mm is abutted at a center of a protecting mat which is fixed on an earth at six different points and penetrates through the mat at a speed of 300 mm per minute.

The Japan Impervious System Association requires a mat should be born with a force exceeding 500 N(Newton).

Figure 13:
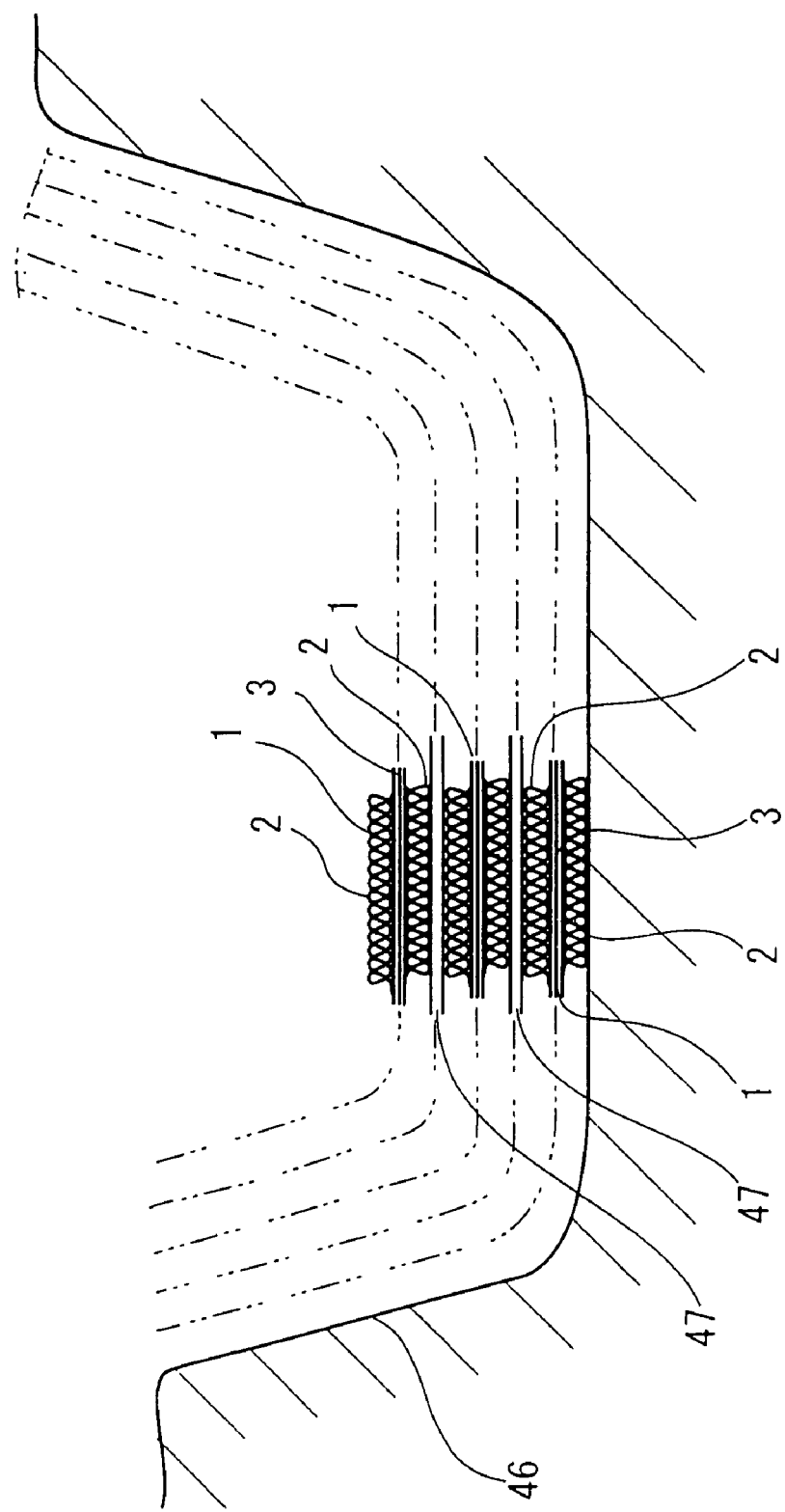
FIG. 13 is a cross-sectional view for explaining one embodiment of the sheet material of the present invention which is used in an industrial wastes treating site.

In the present invention, an impervious sheet denotes a sheet which can be used in a final industrial waste treatment facility and especially used as a water proof sheet which is spread out over all surface of the earth inside the final industrial wastes treatment facility for performing water proofing work in order to prevent pure ground water from being mixed with contaminated water penetrated through the industrial waste, as shown in FIG. 13.

Note that as one of a specific embodiments of the water proofing works in the final treatment facility for industrial waste, a protection sheet 1 formed by a sheet materials 1 of the present invention is arranged inside of a hole 46 excavated in the earth so as to use as an industrial waste treatment facility, and commonly used with a normal impervious sheet (used in an impervious system) or normal water proofing sheet 47.

In this embodiment, in order to protect the two layered impervious sheets (used in an impervious system) or the water proofing sheets 47, three protection sheets 1 of the present invention are arranged so that a first protection sheet 1 is arranged over an upper impervious sheet or the water proofing sheet 47, a second one is arranged between the upper and a lower impervious sheets or the water proofing sheets 47, and a third one is arranged under the lower impervious sheet or the water proofing sheet.

Next, another embodiment of the method for producing the block like sheet material or a sheet material of the present invention with reference to FIG. 6.

This embodiment relates to a method for producing a block like sheet material 100 as shown in FIG. 6 or a longitudinal sheet material 1 in which a plurality of the block like sheet materials 100 are adjacently arranged with each other.

And, in this method of the present invention, in a pair of tile carpets each comprising a fiber assembled layer 2 and a backing layer 3 including a synthetic resin, a pair of fiber fabrication layer units 15 or a pair of the tile carpet 5 and the fiber fabrication layer unit 15, either one of the backing layer 3 or the fiber fixing portion 3' of either one of the tile carpet 5 or the fiber fabrication layer unit 15 in one pair thereof is connected to the fiber assembled layer 2 of either one of the tile carpet 5 or the fiber fabrication layer unit 15 of another pair, with utilizing suitable adhesive or heat-melting treatment, with or without interposing a reinforcing sheet therebetween.

Next, another embodiment of a method for separating and collecting or retrieving the fiber fabrication layer unit 15 and the backing layer 3 from a tile carpet 5 of the present invention basically comprises a step of applying a pressured shearing force to an external surface of the backing layer 3 of the tile carpet 5 which comprising a fiber assembled layer 2 having a predetermined thickness and a backing layer 3 including a synthetic resin and formed on one of surfaces of the fiber assembled layer 2 so that at least a part of the backing layer 3 is separated from the fiber assembled layer 2 or from a rest of portion of the backing layer 3.

The specific constructions thereof are substantially the same as the method for producing the above-mentioned fiber fabrication layer unit 15 and thus further detailed explanations thereof are omitted.

Figure 9:
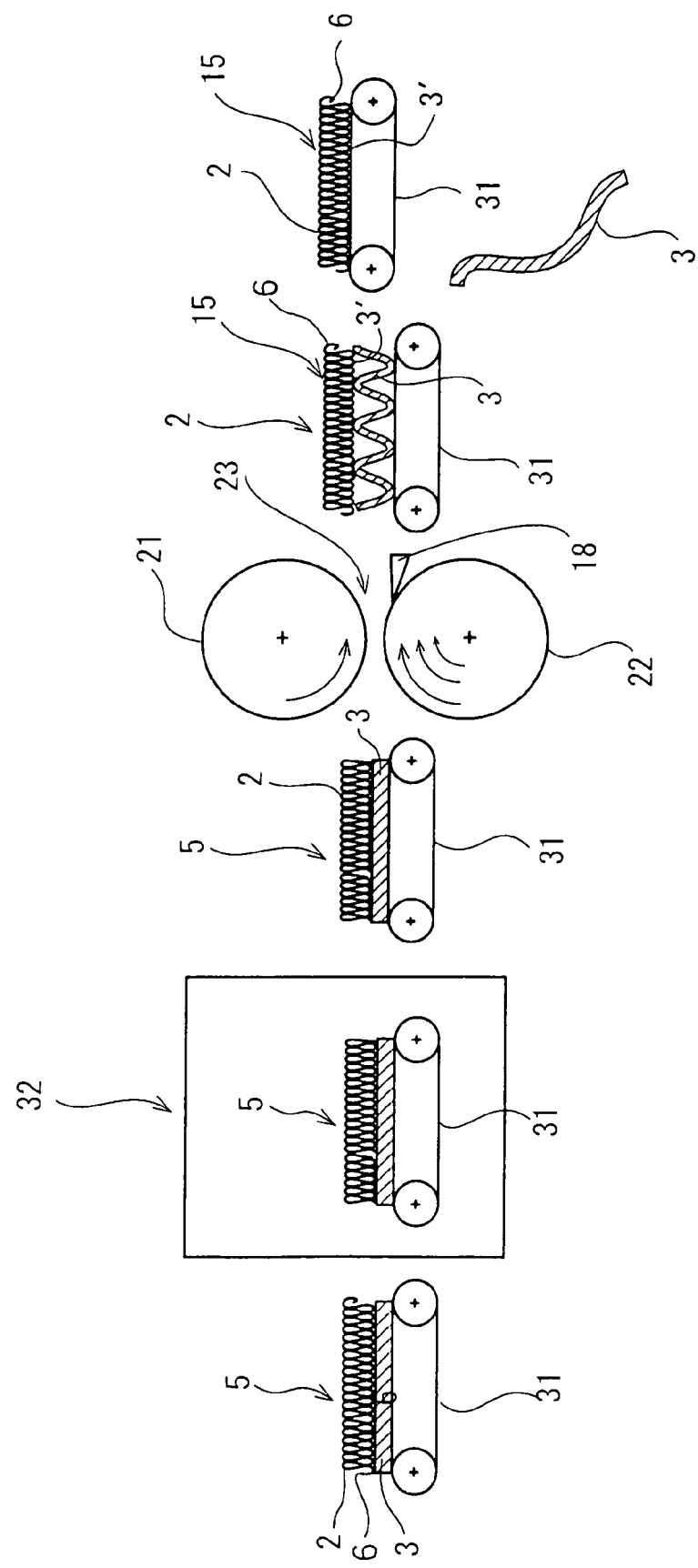
FIG. 9 is a view explaining another embodiment of a method for separating the fiber fabrication layer unit and the backing layer from a tile carpet, in the present invention.

FIG. 9 is a cross-sectional view showing another embodiment of a process for producing the fiber fabrication layer unit 15 and for separating and retrieving the fiber fabrication layer unit 15 and the backing layer 3 from a tile carpet, in the present invention.

Note that, in FIG. 9, a tile carpet 5 which is a used tile carpet collected from the market or which has lost the merits to be used in the market, is moved through a heating furnace 32 with being provided on a conveyer 31, so that a tile carpet 5 is heated.

And then, it is supplied to a pair of rollers 21 and 22, the rotational speed thereof being different from each other.

At this moment, the backing layer 3 which is a lining sheet material made of vinyl chloride resin of the tile carpet 5 thus heated, is contacted with the roller 22, the rotational speed of which is faster than that of the opposite roller 21, while the fiber assembled layer 2 of the tile carped 5 is contacted to the roller 21 the rotational speed of which is slower than that of the opposite roller 22.

After when the tile carpet 5 has passed through the gap 23 formed between the pair rollers 21 and 22, the tile carpet 5 comes out from the roller with a condition in that the backing layer 3 is extended so that it is separated from the fiber assembled layer 2.

For example, a scraper blade 18 is provided on the roller 22 the rotational speed of which being faster than that of the opposite roller 22 and thus the backing layer 3 made of vinyl chloride resin which is attached to a surface of the roller 22 is picked up by the blade 18 so as to be guided to a conveyer 31 provided in a separation process and to be easily separated therefrom.

On the other hand, the fiber fabrication layer unit 15 is separated by a separate conveyer 31.

Figure 14:
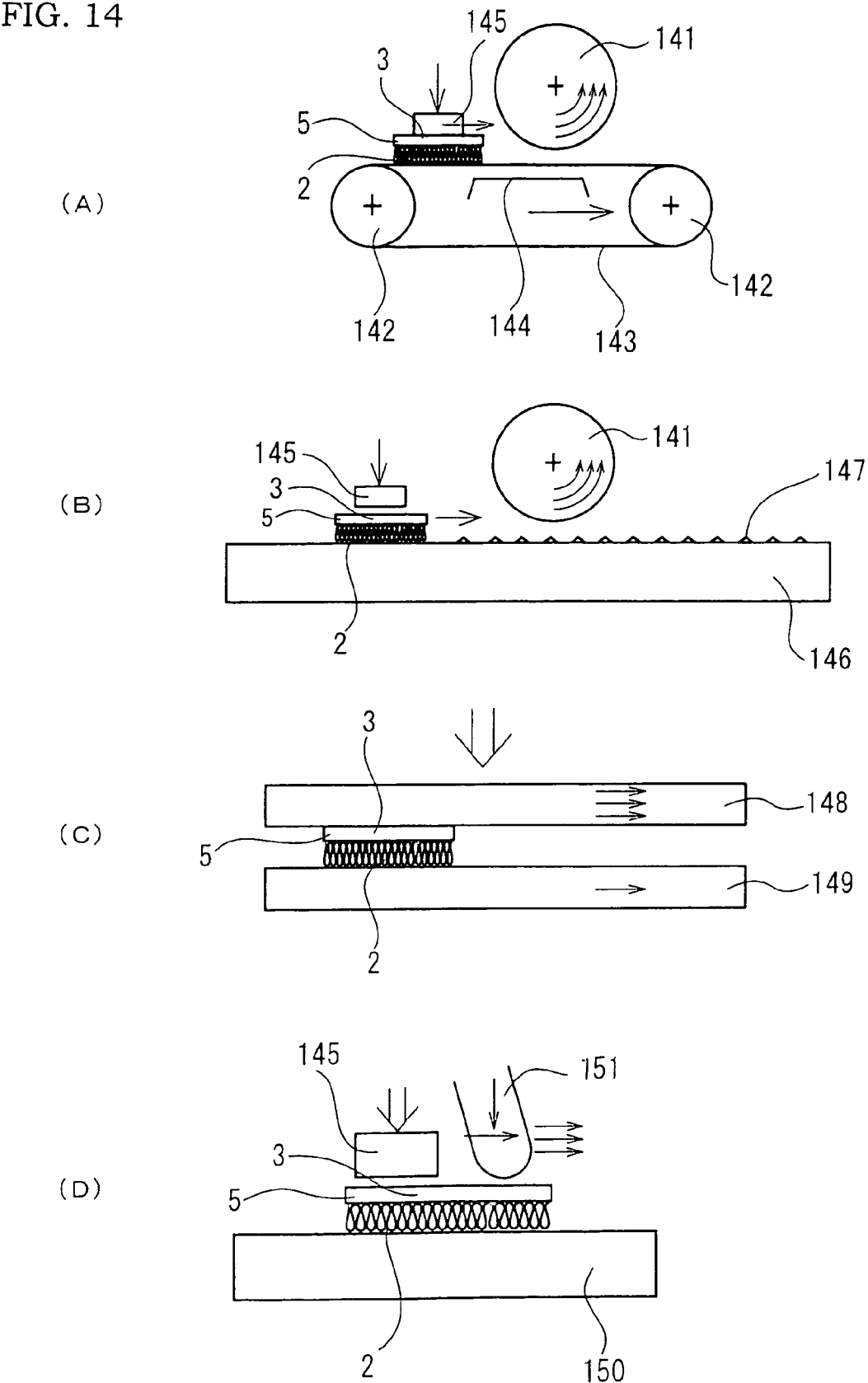
FIGS. 14(A) to 14(D) are cross-sectional views illustrating another embodiment of a method for separating the fiber fabrication

Next, further embodiment of a method for separating the fiber fabrication layer unit 15 from a tile carpet 5 with utilizing a pressured shearing force which is a principal method in the present invention will be explained with reference to FIG. 14.

Note that, as shown in FIG. 14(A), a conveyer belt 143 which can move in a direction as shown by an arrow and which is driven by a pair of rotating rollers 142 is provided and a rotating roller 141 is also provided on an upper position over the belt 143.

In this configuration, a external surface speed of the roller 141 is set at a rotational speed 1.2 to 5 times faster than a surface moving speed of the conveyer 143 and a gap formed between the rotating roller 141 and a solid supporting plate 144 which is provided under the conveyer belt 143 is set at a distance being less than a thickness of the backing layer 3 of a tile carpet 5 to be treated.

After that, a heated tile carpet 5 is supplied to pass through the gap formed between the rotating roller 141 and the conveyer belt 143 so that the backing layer 3 is contacted with a surface of the rotating roller 141, whereby the displacement among the adjacently arranged layers is arisen on a boundary phase formed between the fiber assembled layer 2 and the backing layer 3 of the tile carpet 5 or inside the backing layer 3.

The heating condition for the tile carpet 5 of this embodiment may be the same as the heating condition of the above-mentioned embodiment.

On the other hand, as a different embodiment of a method for separating a fiber fabrication layer unit 15 from a tile carpet 5, as shown in FIG. 14(B), a fixed or a movable substrate 146 is provided and a rotating roller 141 is provided over the fixed or a movable substrate 146 with setting a gap formed between the rotating roller 141 and the fixed or a movable substrate 146 at a distance less than a thickness of a backing layer 3 of a tile carpet 5 to be treated.

After that, a heated tile carpet 5 is supplied to pass through the gap formed between the rotating roller 141 and the fixed or a movable substrate 146 so that the backing layer 3 of the heated tile carpet 5 is contacted with a surface of the rotating roller 141, whereby the displacement among the adjacently arranged layers is arisen on a boundary phase formed between the fiber assembled layer 2 and the backing layer 3 of the tile carpet 5 or inside the backing layer 3.

The heating condition for the tile carpet 5 of this embodiment may be the same as the heating condition of the above-mentioned embodiment.

Further, in further different embodiment of the method for separating the fiber fabrication layer unit 15 from a tile carpet 5, as shown in FIG. 14(C), a pair of movable substrates 148 and 149 each being relatively moved against to each other is provided, with setting a gap formed therebetween at a distance being less that a thickness of the backing layer 3 of the tile carpet 5.

Then, after setting a surface moving speed of one of the movable substrate, for example, the movable substrate 148 at a moving speed at 1.2 to 5 times faster than that of the opposite movable substrate 149, the heated tile carpet 5 is supplied to and moved through the gap formed between the pair of movable substrates 148 and 149 so that the backing layer 3 is contacted with the movable substrate 148, whereby the displacement among the adjacently arranged layers is arisen on a boundary phase formed between the fiber assembled layer 2 and the backing layer 3 of the tile carpet 5 or inside the backing layer 3.

The heating condition for the tile carpet 5 of this embodiment may be the same as the heating condition of the above-mentioned embodiment.

On the other hand, in a further separate embodiment of a method for separating a fiber fabrication layer unit 15 from a tile carpet 5, as shown in FIG. 14(D), a fixed substrate 150 is firstly provided and a pressured shearing device 151 having a function to apply a shearing operation to a backing layer 3 by sliding the same in one direction in contact with a surface of the backing layer 3 with pressing the backing layer downwardly is provided on an upper portion of the over the fixed substrate 150.

After setting a gap formed between the fixed substrate 150 and the pressured shearing device 151 at a distance less than a thickness of a backing layer 3 of a tile carpet 5 to be treated, the heated tile carpet 5 is supplied to and moved through the gap formed between the fixed substrate 150 and the pressured shearing device 151, so that the backing layer 3 is contacted with the pressured shearing device 151, whereby the displacement among the adjacently arranged layers is arisen on a boundary phase formed between the fiber assembled layer 2 and the backing layer 3 of the tile carpet 5 or inside the backing layer 3.

The heating condition for the tile carpet 5 of this embodiment may be the same as the heating condition of the above-mentioned embodiment.

Note that, in any one of the above-mentioned embodiments of the present invention, it is preferable that a pressing and holding member 145 which has functions in that it can press the heated tile carpets 5 with a desired pressing force until the tile carpet 5 approaches to just front of the pressured shearing device 141 or 151, and it can transfer the tile carpet 5 in a direction to the pressured shearing device 141 or 151.

And, in any one of the above-mentioned embodiments of the present invention, it is also preferable that on a surface of any one of the conveyer belt 143, the fixed substrate 146, 150 or the movable substrate 148, 149, a anti-sliding member 147 may be provided.

Figure 10:
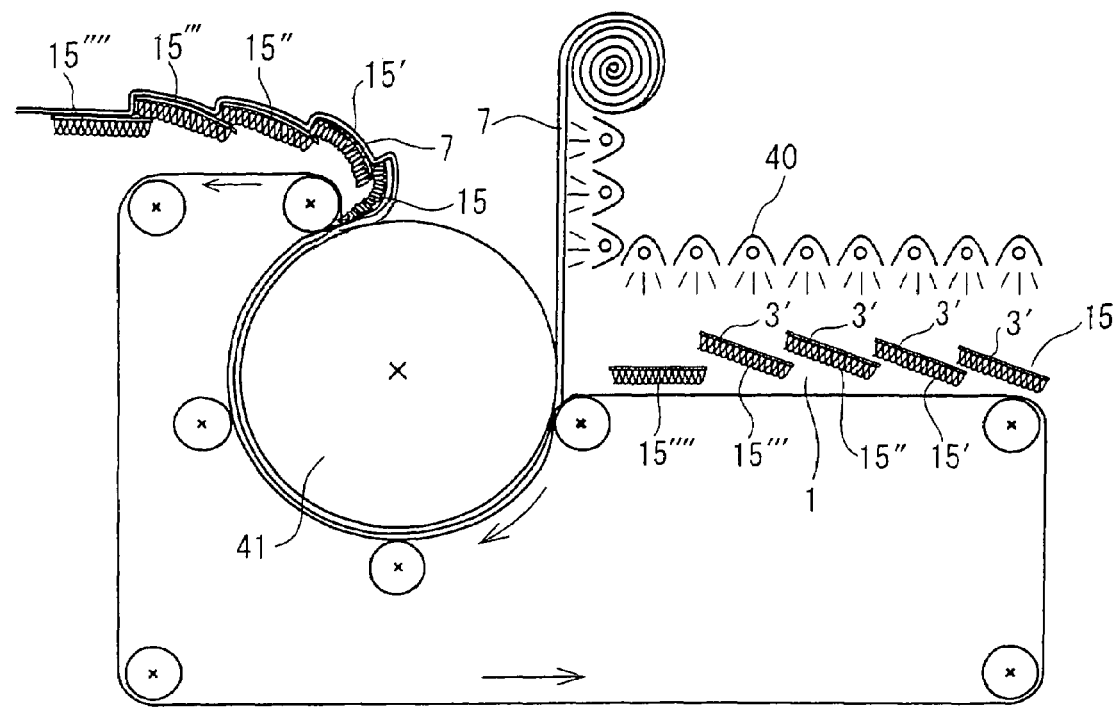
FIG. 10 is a cross-sectional view for explaining one embodiment of a method for producing a sheet material of the present invention.

FIG. 10 shows a cross-sectional view showing one embodiment of a process for producing a longitudinal sheet material 1 having a looped surface formed on one surface of the sheet.

In this embodiment, an object of this embodiment is to use this longitudinal sheet as a protection sheet for a water proofing layer or an impervious sheet layer.

To attain the object as mentioned above, a plurality of used tile carpets 5, 5', 5", . . . (not shown) having unit like configuration with a predetermined width and length and which has been collected from a market, or a plurality of fiber fabrication layer units 15, 15', 15", . . . each having a shearing separation treatment surface 4 which being obtained by applying, for example, the shearing separation treatment to the tile carpets, are adjacently arranged with each other so that at least a portion of the tile carpets or the fiber fabrication layer units each being overlapped with each other.

After that, the fiber fixing portions 3' each having the shearing separation treatment surface 4 of each one of the fiber fabrication layer units 15, 15', 15", . . . are heated with a desired heating device 40 so that the fiber fixing portion 3' which is a remaining part of the backing layer 3 and having the shearing separation treatment surface 4, are melted thereby a part of one fiber fabrication layer unit 15 is connected to a part of another one being adjacently arranged thereto to form a continuous longitudinal sheet material 1.

And simultaneously with this, on a side of the fiber fixing portion 3' of the fiber fabrication layer unit 15 a desired reinforcing sheet 7 made of vinyl chloride resin, for example, is attached so that the fiber assembled layers 2 of the fiber fabrication layer units 15 form an external surface thereof, thereafter a suitable adhesive treatment is carried out with utilizing an appropriate cooling roller 41 thereby a longitudinal sheet material 1 having a loop surface on one of the surfaces of the sheet material, is obtained.

Note that, although FIG. 10 shows one embodiment of a method for producing a sheet material 1, in which a plurality of the fiber fixing portions 3' of the fiber fabrication layer units 15 are connected to one surface of the reinforcing sheet 7, it can be possible that a plurality of tile carpets 5 or a plurality of the fiber fabrication layer units 15 separately prepared, are adjacently arranged with each other with an appropriate arrangement pattern on an opposite surface of the reinforcing sheet 7 to that of the above-mentioned, and these fiber fabrication layer units 15 separately prepared are heated utilizing the heating device 41 as shown in FIG. 10, so as to be connected to the opposite surface of the reinforcing sheet 7 as mentioned above, and then, the resulted sheet material is caused to be passed through the cooling device 41.

Thereafter, a sheet material 1 having a longitudinal configuration and having a loop surface on both surfaces of the sheet material is obtained by cutting out the same from the longitudinal sheet material and is trimmed to have desired dimensions.

Figure 2:
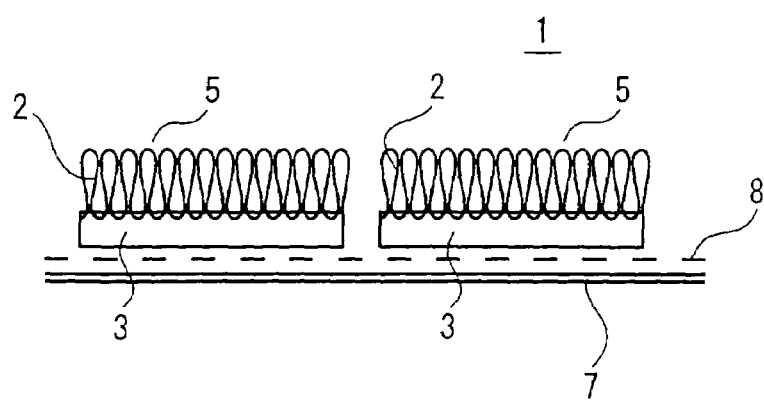
Figure 2:
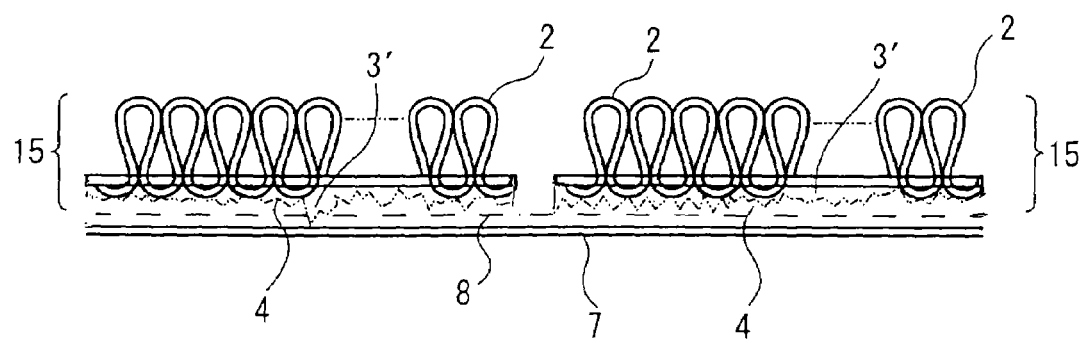

Note that an embodiment of a method for producing a sheet material 1 as shown in FIGS. 2 to 4, is already explained.

Figure 11:
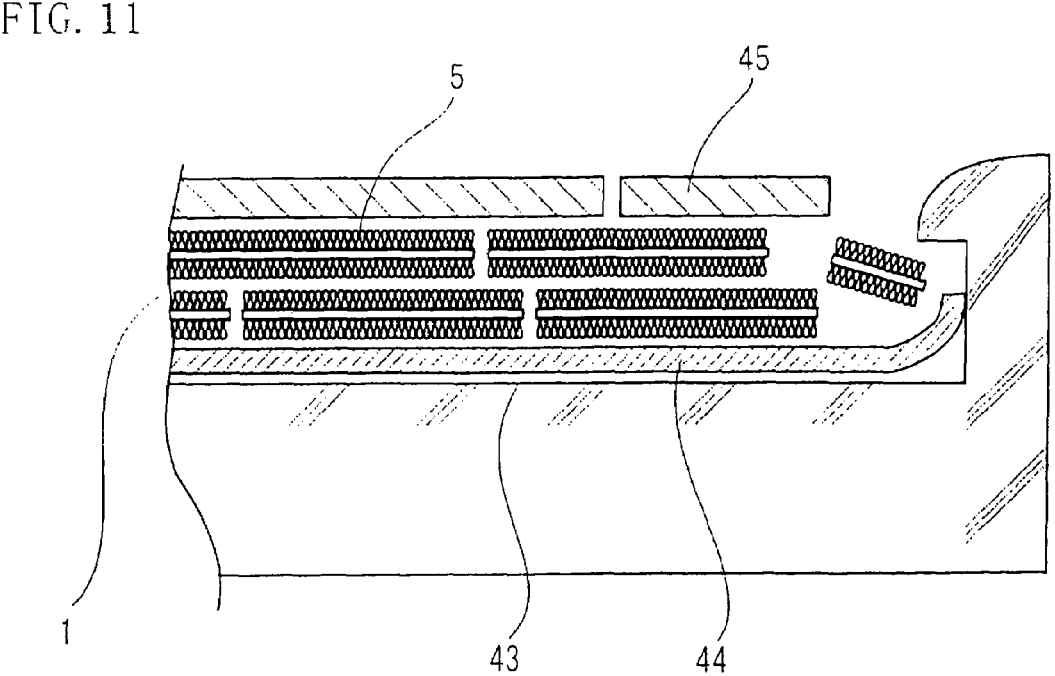
FIG. 11 is a cross-sectional view of a construction of a sheet material which is used in a part of a roof-top garden.

FIG. 11 shows a cross-sectional view showing an embodiment in that a plate like sheet material 1 is used for a protecting layer serving as a water proof material used a work for roof top greening.

More precisely, as shown in FIG. 11, the plate like sheet material 1 having a loop surface on both surfaces of the sheet material 1 which can be obtained by cutting out from the sheet that is formed by mutually connecting a plurality of the tile carpets 5 or a plurality of the fiber fabrication layer units 15 with each other so that a fiber assembled layer 2 such as a loop layer, i.e., a fiber arrangement layer, are facing to an external direction.

And then the plate like sheet material 1 having a predetermined dimensions, is used as shown in FIG. 11 when a construction work for a rooftop greening on a rooftop of a building is performed.

In FIG. 11, a desired water proofing sheet layer or a desired impervious sheet layer are spread out on a rooftop under layer 43 on a rooftop of a building and then the sheet material 1 of the present invention is spread out over all the sheet as mentioned above.

After that, a rooftop greening layer 45 including desired soil with flowers is arranged on the sheet material 1.

Figure 12:
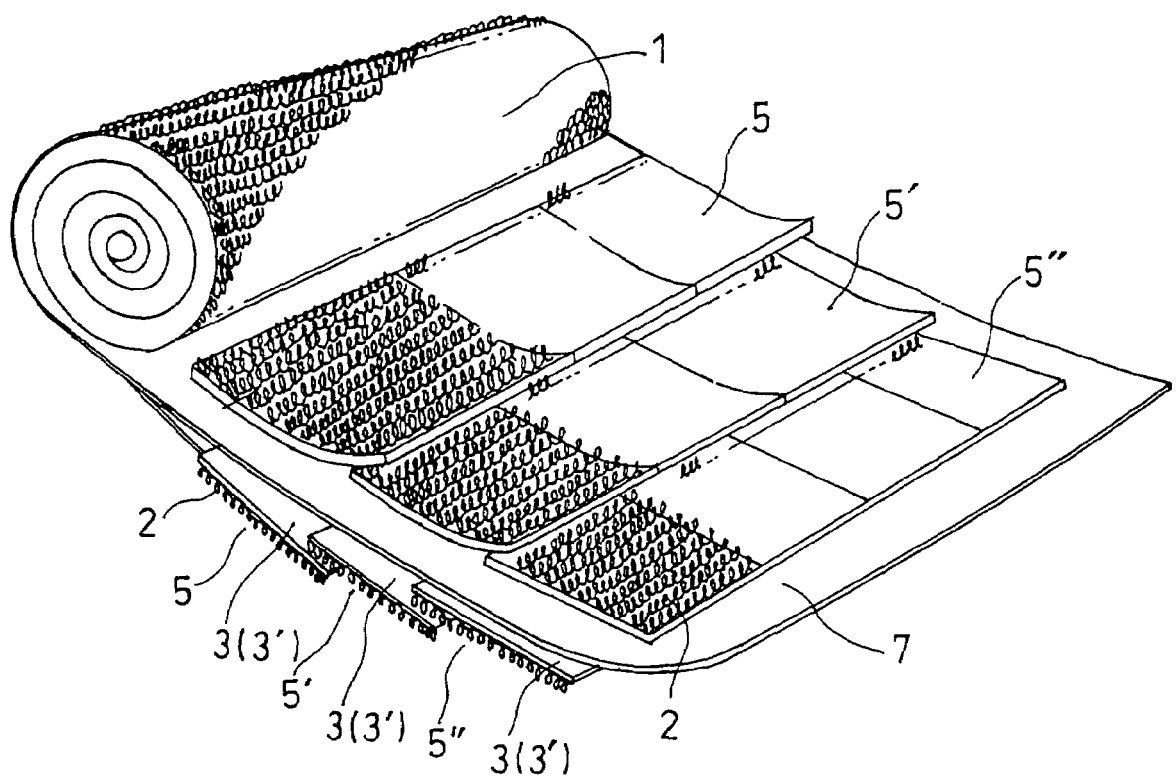
FIG. 12 is a view illustrating a different application of the sheet material of the present invention.

Next, FIG. 12 is a schematic view showing a longitudinal sheet material 1 having both surfaces each being provided with loop surfaces, cut pile surfaces, or desired fiber arranged layers, and which is obtained by cutting out the same from a longitudinal sheet material wherein the sheet material is produced by adjacently arranging a plurality of the tile carpets 5 or a plurality of the fiber fabrication layer units 15 to each other and also by stacking them with each other and connected to each other with interposing a reinforcing sheet 7 therebetween so that the fiber assembled layer 2 of the tile carpets or the fiber fabrication layer unit, are disposed so to face to an externally direction, and further wherein an arrangement phase in a first sheet layer formed on one side of the reinforcing sheet 7 is different from an arrangement phase in a second sheet layer formed on another side of the reinforcing sheet.

And finally, the longitudinal sheet material is cut out from the resulted sheet and trimmed to have desired dimensions.

On the other hand, FIG. 13 shows a cross-sectional view of a protecting sheet of the present invention which can be used for an impervious system in an industrial wastes final treatment facility and in FIG. 13, 46 denotes a hole excavated in the earth so as to use as an industrial wastes treatment facility and 47 denotes an impervious system or a water proofing sheet which is spread out overall inside the hole 46.

And three sheet materials 1 of the present invention are used for protecting layers to cover over a surface of the water proofing layer or the impervious system 47 so that they are spread out over an upper portion of a first water proofing layer or impervious system 47, along a center portion of the first and second proofing layers or impervious system 47 and below the second proofing layers or impervious system 47, respectively.

Note that in the present invention, two used tile carpets 5 or two tile carpets which has lost the merit to be used in the market or two fiber fabrication layer units 15 having a shearing separation treatment surface 4 formed by applying the shearing separation treatment to the tile carpet collected from a market, are contacted with each other utilizing heat energy or desired adhesive so that the fiber assembled layer 2 are disposed to face to an external direction.

Thereafter, a completed sheet material is trimmed so as to have a predetermined dimensions thereby the plate like sheet material 1 having the fiber assembled layer surfaces with the loop piles or the cut piles on both surfaces of the sheet material can be obtained.

Or, a longitudinal sheet material 1 having fiber assembled layers with the loop piles or the cut piles on both surfaces is produced, in such a way that a plurality of tile carpets 5 or a plurality of fiber fabrication layer units 15 or both are adjacently arranged to each other and stacked with each other as mentioned above, with an arrangement phase thereof formed on one side of the sheet material being different from that formed on another side of the sheet material and finally which is trimmed to have desired dimensions.

This sheet material 1 can be used as a protection sheet for a water proofing layer or impervious sheet layer.

Further, when the outdoor tile carpet (walk on without taking off one's footgear) having a plate like configuration with surface of the fiber assembled layer 2 on both surfaces thereof, is spread out over all a ground in elementary and middle schools which typically comprising concrete, damages for juvenile students caused by turn over will be reduced.

In addition, the sheet material 1 of the present invention can also be used for a floor covering sheet material as a tile carpet or fiber fabrication layer unit with a loop layer on a bottom surface of the sheet material.

In this case, when the sheet material 1 of the present invention which is provided with the fiber assembled layer 2 having a plurality of loop like fibers such as a loop pile or the like formed on a back surface thereof, and when these sheet materials are spread out over the predetermined floor covering material, a part of a desired pressure sensitive connecting member (hook and loop fastener, for example, "Magic Fastener" (Trademark)), for example, a member having sticky adhesive on one surface thereof and having a plurality of hook like members which can be engaged with the loop on another surface thereof, are previously deposited on the floor utilizing the sticky adhesive material.

By doing this, the sheet material 1 can be easily and fixedly connected to the floor material with the same theory as that of the pressure sensitive adhesive fastener so that the floor covering operation can be easily performed.

Accordingly, the conventional installing operation work with using an adhesive or sticky adhesive can be greatly improved as well as a problem can also be improved in which a sleeve of a working uniform is frequently spoiled by the sticky adhesive arranged on a raised floor, when wiring layout operation for electricity, telephones or computers or the like is performed.

EXAMPLES

Hereunder, the present invention will be further specifically explained by several examples but the present invention does not restricted to any extent by any one of the following examples.

Example 1

By utilizing a treatment device as shown in FIG. 9, a collected tile carpet (having a total thickness of 6.5 mm and a thickness of a backing layer such as a lining sheet made of vinyl chloride resin of 3.0 mm) was heated by inserting it in a furnace which was heated at temperature of 200° C., for 2.5 minutes so that a surface temperature of the lining sheet made of vinyl chloride resin of the tile carpet was raised up to 140° C.

And immediately after that, the tile carpet was passed through a gap 23 formed between a pair of rollers so that the lining sheet made of vinyl chloride resin was contacted to a roller of the pair of rollers the rotating speed of which being faster than that of another roller in the pair of rollers.

The gap 23 formed between the pair of rollers was previously set at 1.2 mm and the temperature of the roller was set at 30° C. while the difference in rotational speed between both rollers in the pair was set at 4.2 times.

On the other hand, although, a weight ratio of the fiber assembled layer to the backing layer such as the lining sheet made of vinyl chloride compound was about 13 to 87, as a result of the separation procedure through the process as shown in FIG. 9, whereby the tile carpet was separated into two layers, the tile carpet was separated into a fiber fabrication layer unit (39 weight %) including a fiber fixing portion to which a part of the lining sheet made of vinyl chloride compound has attached with powder condition and a pure lining sheet made of vinyl chloride compound (61 weight %).

Example 2

Two collected tile carpets were heated utilizing an infra-red heating device at the temperature of 175° C. and then both of the tile carpets were contacted with each other so that each one of backing layers of both of the tile carpets were oppositely arranged to each other, with making a loop layer of the fiber assembled layer of each one of the tile carpets disposed on an external surface of the product.

And immediately after that the two tile carpets thus stacked with each other was passed through a rolling press heated at the temperature of 25° C., causing these tile carpets to be adhered to each other thereby a block like sheet material having a looped surface on both surfaces of the sheet was obtained.

After that a final product of the block like sheet material was cut out therefrom and was trimmed to have a dimensions of 450 mm×450 mm and which was used for a protection sheet material for a water proofing layer used for a under layer of a rooftop greening area.

Example 3

A plurality of collected fiber fabrication layer units were heated utilizing an infra-red heating device at the temperature of 175° C. and then each one of the fiber fabrication layer units were contacted with each other so that each of the fiber fixing portion of each one of the fiber fabrication layer units were opposed to each other with interposing an reinforcing sheet which was a longitudinal vinyl chloride resin sheet and having a thickness of 0.5 mm, therebetween.

By doing this, the loop layers of the fiber assembled layers of each one of the fiber fabrication layer unit are disposed on an external surface of the product.

And wherein in arranging the plurality of the fiber fabrication layer units on both side surfaces of the reinforcing sheet, respectively to form a stacked configuration, they are arranged so that an arrangement phase formed among the fiber fabrication layer units on one surface of the reinforcing sheet was different from that formed among them on another surface thereof.

Immediately after that, the longitudinal sheet was passed through a rolling press heated at the temperature of 25° C., causing these two stacked sheets to be adhered to each other thereby a longitudinal sheet material 1 having a looped surface on both surfaces of the sheet was obtained.

After that a final product of the longitudinal sheet material was cut out therefrom with trimming the same with a dimensions of 2 m×20 m.

This longitudinal sheet material had the puncture resistance value of 650 N and thus it could be used as a protection layer for an impervious system used for an industrial waste final treating equipment.

Example 4

One selected used tile carpet among the collected used tile carpets, was treated to separate a fiber fabrication layer unit 15 having a shearing separation treatment surface 4 which is formed of a lining sheet material made of vinyl chloride compound after 65 wt % of total backing layer of the tile carpet has been removed, therefrom.

And a fiber fixing portion of the fiber fabrication layer unit 15 thus obtained and a backing layer of one other collected used tile carpet per se, were heated utilizing an infra-red heating device at the temperature of 175° C. and then both of the tile carpet and the fiber fabrication layer unit were contacted with each other so that each one of the fiber assembled layers of both of the tile carpet and the fiber fabrication layer unit were provided on both surfaces of the sheet.

And immediately after that, the stacked sheet material formed by the tile carpet and the fiber fabrication layer unit was passed through a rolling press heated at the temperature of 25° C., causing the stacked sheet materials to be adhered to each other thereby a block like sheet material having a looped surface on both surfaces of the sheet material was obtained.

After that a final product of unit plate like sheet material was cut out therefrom with trimming the same with a dimensions of 450 mm×450 mm and which was dyed with green color.

It was used for a ground carpet for elementary schools and a floor covering work had been done by contacting the same on a surface of concrete foundation with utilizing a double faced adhesive fastener, such as a hook-and-loop fastener.

In accordance with a further different embodiment of a method for separating and collecting the fiber assembled layer and the backing layer from a tile carpet of the present invention, the method of the present invention can provide an effective and economical method for recycling the used tile carpets as a source without disposing them, in order to resolve the collecting and disposing the used tile carpet which has been questioned in the past when they are disposed as the industrial wastes.

Note that, in the above-mentioned embodiments of the present invention, the fiber assembled layer and the backing layer are surely and easily separated from the tile carpet with an economical way as well as the fiber assembled layer thus separated therefrom can be recycled.

Further, the backing layer can also be recycled with utilizing the chemical method such as melting method, heating method or the like or physical method.

Since the present invention adopts the above-mentioned technical features, the following effects as shown by (1) to (7) can be obtained;

(1) Although the fiber fabrication layer unit thus separated from a tile carpet has a fiber fixing portion containing a part of the backing layer such as the lining sheet made of vinyl chloride resin on one surface of the fiber fabrication layer unit, on another surface thereof, the fiber assembled layer which once consisted of a carpet layer, is remained causing the fiber fabrication layer unit still to have good cushion characteristic which is unique to the carpet.

Accordingly, by connecting two fiber fabrication layer unit thus separated and retrieved from a tile carpet to each other so that the fiber assembled layer, containing loops therein, of the fiber fabrication layer unit, are arranged to face to an external direction and adhered with each other utilizing heat energy or a suitable adhesive.

After that, the resulted sheet material is cut out or trimmed with predetermined dimension, thereby a plate like sheet material having a loop surface on both surface, can be obtained.

Or, when a plurality of the fiber fabrication layer units are adjacently arranged to each other to form one longitudinal sheet layer and the same are also adjacently arranged to each other to form another longitudinal sheet layer, and both longitudinal sheet layers are adhered to each other, they are stacked in such as way that an arrangement phase of one sheet layer is different from that of the another sheet layer.

Thereafter, the resulted longitudinal sheet material is cut out or trimmed with desired dimensions to form the longitudinal sheet material having a loop surface provided on both surfaces of the sheet material, which can be used as a protection layer for a water proofing layer or an impervious sheet.

(2) When the outdoor tile carpet (walk on without taking off one's footgear) which has a plate like configuration with a loop pile surfaces on both surfaces thereof, is spread out over all a ground in elementary and middle schools in a downtown, which typically comprising concrete, damages for juvenile students caused by turn over will be reduced.

(3) In the present invention, although the fiber fabrication layer unit thus separated from a tile carpet has a fiber fixing portion including therein a part of the backing layer which is a lining sheet made of vinyl chloride resin on one of the surfaces thereof, on the another surface of the fiber fabrication layer unit, a fiber assembled layer which once consisting of a carpet layer is remained.

Further, especially when the loop piles are remained thereon, and when a suitable attaching member which can contact to the loop pile surface of a tile carpet or a floor covering material is prepared, in a case in which the fiber fabrication layer unit is arranged so that the loop surface thereof is faced to a down direction, it can be used as a floor covering material with the attaching member, for example, a pressure sensitive fastener.

Accordingly, when it is used for a floor covering operation for a raised floor, a problem in which a sleeve of a working uniform is frequently spoiled by the sticky adhesive arranged on a raised floor, when wiring layout operation for electricity, telephones or computers or the like is performed, can also be resolved.

(4) In the present invention, a fiber fabrication layer unit corresponding to a carpet layer and a backing layer corresponding to a lining sheet made of vinyl chloride resin are separated from a tile carpet which was a waste and which has no way other than to be disposed in a management type industrial waste treatment equipment in the past, with a simple operation and process in that the tile carpet is heated and is moved through a gap formed between a pair of rollers.

(5) Further, in the present invention, since the separated backing layer corresponding to a lining sheet made of vinyl chloride resin does not include therein fiber dusts of a carpet and also the purity of the vinyl chloride compound is extremely high as a lining sheet, it is very useful to recycle the backing layer to use as a material of a floor covering material for a carpet after the backing layer is re-melted.

(6) This process generates less noise and consumes less energy comparing with conventional processes.

And further, in accordance with the present invention, this process does not require a crushing process and a clipping process and thus no fiber wastes of a carpet or other dusts is generated and accordingly this process is extremely sophisticate for working environment and for human health for workers.

(7) When the present invention and the invention as disclosed in the Japanese Patent Application No. 2002-320421 are commonly used, it can be possible that the tile carpets can reproduced and recycled 100% as sources and about twenty millions $m^2$ (20,000,000 $m^2$) (corresponding to one hundred thousands tons (100,000 tons)) of industrial wastes in one year are turned into the sources so that so called zero-emission can be realized in the tile carpet industry.

This fact has un-expectable social signification.

It is apparent from the above-mentioned explanations, the present invention basically adopts the above-mentioned technical feature, and thus when a recycle treatment for the tile carpets especially for the tile carpet which lost a chance to be used in the markets or the tile carpets which have been used and collected to be treated as waste disposal, is carried out, the present invention can provide a method for effectively separating and retrieving the fiber fabrication layer unit including the fiber assembled layer once serving as a carpet layer, and the backing layer including therein a synthetic resin which once being used for a lining sheet for the fiber assembled layer, before the tile carpet is broken without using large amount of energy as well as with less noise and less dust particles, and also can provide a method to effectively reuse the backing layer thus separated and retrieved from the tile carpet and the fiber fabrication layer unit thus also separated and retrieved from the tile carpet and which comprising a fiber assembled layer or a fiber fixing portion which comprising a synthetic resin layer provided on a part of the fiber assembled layer.

Accordingly, the present invention provides an effective way to obtain an effective, economical and less environmental load waste treating method for treating industrial wastes to reproduce and recycle the same.

What is claimed is:

1. A sheet material having a longitudinal configuration, said longitudinal sheet material being formed so that a plurality of unit sheet materials are adjacently arranged to each other with side by side configuration in two dimensional direction, before said unit sheet materials are put on a floor so as to be carryable, and wherein said sheet material is cut out to produce a backing layer used for recycled tile carpet, wherein said unit sheet materials are either one of a tile carpet comprising a fiber assembled layer comprising a plurality of loop piles or a plurality of cut piles both of which are flexible and tufted in a base fabric both of which being made of thermoplastic and organic material and a backing layer made only of thermoplastic synthetic resin, or a piece of fiber fabrication layer unit which has a predetermined unit surface area and which comprises a fiber assembled layer comprising a plurality of loop piles or a plurality of cut piles tufted in a base fabric both of which being made of thermoplastic and organic material and having a predetermined thickness with a fiber fixing portion containing therein said thermoplastic synthetic resin formed on a part of said fiber assembled layer unit, and at least on a part of a surface of said fiber fixing portion, a shearing separation treatment surface being provided;

said longitudinal sheet material further comprising a first longitudinal sheet material and a second longitudinal sheet material, and wherein said first and said second longitudinal sheet materials are connected with each other with or without interposing a reinforcing sheet therebetween, in a way so that said backing layers or said fiber fixing portions of both said first and second longitudinal sheet materials are oppositely faced to each other, or so that said backing layers of one of said first and second longitudinal sheet materials are oppositely faced to said fiber fixing portions of said opposite longitudinal sheet material, or so that either one of said backing layers and said fiber fixing portions of either one of said first and second longitudinal sheet materials are oppositely faced to said fiber assembled layer of the other of said first and second longitudinal sheet material.

2. A sheet material having a longitudinal configuration, said longitudinal sheet material being formed so that a plurality of unit sheet materials are adjacently arranged to each other with side by side configuration in two dimensional direction, before said unit sheet materials are put on a floor so as to be carryable, and wherein said sheet material is cut out to produce a backing layer used for recycled tile carpet, wherein said unit sheet materials are either one of a tile carpet comprising a fiber assembled layer comprising a plurality of loop piles or a plurality of cut piles both of which are flexible and tufted in a base fabric both of which being made of thermoplastic and organic material and a backing layer made only of thermoplastic synthetic resin, or a piece of fiber fabrication layer unit which has a predetermined unit surface area and which comprises a fiber assembled layer comprising a plurality of loop piles or a plurality of cut piles tufted in a base fabric both of which being made of thermoplastic and organic material and having a predetermined thickness with a fiber fixing portion containing therein said thermoplastic synthetic resin formed on a part of said fiber assembled layer unit, and at least on a part of a surface of said fiber fixing portion, a shearing separation treatment surface being provided.

said longitudinal sheet material further comprising a first longitudinal sheet material and a second longitudinal sheet material, and wherein said first and said second longitudinal sheet materials are connected with each other with or without interposing a reinforcing sheet therebetween, in a way so that said backing layers or said fiber fixing portions of both said first and second longitudinal sheet materials are oppositely faced to each other, or so that said backing layers of one of said first and second longitudinal sheet materials are oppositely faced to said fiber fixing portions of said separate longitudinal sheet material, or so that either one of said backing layers and said fiber fixing portions of either one of said first and second longitudinal sheet materials are oppositely faced to said fiber assembled layer of the other of said first and second longitudinal sheet material, and further wherein said first and second longitudinal sheet materials are connected with each other in a way in that either one of connecting lines and overlapping lines formed among a plurality of unit sheet materials each being adjacently arranged to each other in said first longitudinal sheet material, is displaced from either one of said connecting lines and said overlapping lines formed among a plurality of unit sheet materials each being adjacently arranged to each other in said second longitudinal sheet material.

3. A sheet material comprising a pair of tile carpets each comprising a fiber assembled layer and a backing layer including a synthetic resin, or a pair of fiber fabrication layer units having a predetermined unit surface area and comprising a fiber assembled layer having a predetermined thickness with a fiber fixing portion containing therein synthetic resin formed on a part of said fiber assembled layer, and at least on a part of a surface of said fiber fixing portion, a shearing separation treatment surface being provided, and further wherein said tile carpets are connected to each other with each one of said backing layers being oppositely faced with each other or said fiber fabrication layer units being connected to each other with each one of said fiber fixing portions being oppositely faced with each other, and with or without interposing a reinforcing sheet therebetween.

4. A sheet material comprising a tile carpet comprising a fiber assembled layer and a backing layer including a synthetic resin and a fiber fabrication layer unit having a predetermined unit surface area and comprising a fiber assembled layer having a predetermined thickness with a fiber fixing portion containing therein synthetic resin formed on a part of said fiber assembled layer, and at least on a part of a surface of said fiber fixing portion, a shearing separation treatment surface being provided, and further wherein said tile carpet and said fiber fabrication layer units are connected to each other with said backing layer and said fiber fixing portion being oppositely faced with each other with or without interposing a reinforcing sheet therebetween.

5. A sheet material comprising a pair of sheet materials selected from a group of pairs consisting of a pair of tile carpets each comprising a fiber assembled layer and a backing layer including a synthetic resin, a pair of fiber fabrication layer units having a predetermined unit surface area and comprising a fiber assembled layer having a predetermined thickness with a fiber fixing portion containing therein synthetic resin formed on a part of said fiber assembled layer, and at least on a part of a surface of said fiber fixing portion, a shearing separation treatment surface being provided, and a pair of said tile carpet and said fiber fabrication layer unit, and further wherein said backing layer of one of said pair of tile carpets or said fiber fixing portion of one of said pair of fiber fabrication layer units is connected with said fiber assembled layer of either one of said another tile carpet and said another fiber fabrication layer unit in said pair, with or without interposing a reinforcing sheet therebetween so as to form a three-dimensional stacked configuration.

6. A sheet used for a carpet which mainly comprises said sheet material as defined by claim 3 or 4, wherein said fiber assembled layer including loop piles therein, is provided on both surfaces of said sheet material.

7. A method for producing a sheet material having a fiber assembled layer provided on both surfaces of said sheet material, wherein in a pair of said sheet materials selected from a group of pairs consisting of a pair of tile carpets each comprising a fiber assembled layer and a backing layer including a synthetic resin, a pair of fiber fabrication layer units having a predetermined unit surface area and comprising a fiber assembled layer having a predetermined thickness with a fiber fixing portion containing therein synthetic resin formed on a part of said fiber assembled layer, and at least on a part of a surface of said fiber fixing portion, a shearing separation treatment surface being provided, and a pair of said tile carpet and said fiber fabrication layer unit, wherein said method comprising a step of mutually connecting both of said backing layers of said pair, both of said fiber fixing portions of said pair, or said backing layer and said fiber fixing portion of said pair oppositely and mutually connected with each other with or without interposing a reinforcing sheet therebetween.

8. A method for producing a sheet material having a fiber assembled layer provided inside of said sheet material, wherein in a pair of said sheet materials selected from a group of pairs consisting of a pair of tile carpets each comprising a fiber assembled layer and a backing layer including a synthetic resin, a pair of fiber fabrication layer units having a predetermined unit surface area and comprising a fiber assembled layer having a predetermined thickness with a fiber fixing portion containing therein synthetic resin formed on a part of said fiber assembled layer, and at least on a part of a surface of said fiber fixing portion, a shearing separation treatment surface being provided, and a pair of said tile carpet and said fiber fabrication layer unit, said method comprising a step of mutually connecting either one of said backing layer or said fiber fixing portion of either one of said tile carpet or said fiber fabrication layer unit in said pair, to said fiber assembled layer of either one of said tile carpet or said fiber fabrication layer unit of another sheet materials in said pair, with or without interposing a reinforcing sheet therebetween.

9. A method for separating and retrieving a fiber fabrication layer unit including a fiber assembled layer therein and a backing layer from a tile carpet comprising a fiber assembled layer having a predetermined thickness and a backing layer formed on one of surfaces of said fiber assembled layer, each of which is directly connected to each other without using adhesive, wherein during heating said tile carpet with a temperature of 110 to 190° C., a pressured shearing force is applied to a surface of said backing layer of said tile carpet so that a part of said backing layer is separated from said fiber assembled layer or a part of said backing layer is separated from said backing layer connected to said fiber assembled layer.

10. A method for separating and retrieving a fiber fabrication layer unit including a fiber assembled layer therein and a backing layer from a tile carpet according to claim 9, said method comprising said steps of;
  setting a gap formed between a pair of rollers with a distance less than a thickness of said backing layer of said tile carpet, wherein a rotational speed of one of said rollers in said pair being set at a rotational speed 1.2 to 5 times faster than that of another roller in said pair,
  heating said tile carpet at a temperature within 110 to 190° C.,
  feeding said heated tile carpet through said gap of said pair of rollers during heating of said carpet so that said backing layer of said tile carpet is contacted with one of said rollers of said pair, said rotational speed of which is faster than that of another roller in said pair, and
  causing a deformation at a boundary phase formed between said backing layer and said fiber assembled layer of said tile carpet or among said inter-layers within said backing layer so that a part of said backing layer is separated from said fiber assembled layer or a part of said backing layer is separated from said backing layer connected to said fiber assembled layer.

11. A sheet material having a longitudinal configuration, said longitudinal sheet material being formed so that a plurality of unit sheet materials are adjacently arranged to each other with side by side configuration in two dimensional direction, before said unit sheet materials are put on a floor so as to be carryable, and wherein said sheet material is cut out to produce a backing layer used for recycled tile carpet, wherein said unit sheet materials are either one of a tile carpet comprising a fiber assembled layer comprising a plurality of loop piles or a plurality of cut piles both of which are flexible and tufted in a base fabric both of which being made of thermoplastic and organic material and a backing layer made only of thermoplastic synthetic resin, or a piece of fiber fabrication layer unit which has a predetermined unit surface area and which comprises a fiber assembled layer comprising a plurality of loop piles or a plurality of cut piles tufted in a base fabric both of which being made of thermoplastic and organic material and having a predetermined thickness with a fiber fixing portion containing therein said thermoplastic synthetic resin formed on a part of said fiber assembled layer unit, and at least on a part of a surface of said fiber fixing portion, a shearing separation treatment surface being provided,
  wherein on a portion at which a plurality of said tile carpets or a plurality of said fiber fabrication layer units are adjacently connected to each other, a side end portion of each one of said tile carpets or said fiber fabrication layer units, is fixedly abutted on an oppositely arranged side end portion of another tile carpet or another fiber fabrication layer unit which is adjacently arranged to said tile carpet or said fiber fabrication layer unit, or at least a part of said tile carpet or said fiber fabrication layer unit including said side end portion thereof is mutually overlapped with at least a part of another tile carpet or another fiber fabrication layer unit which being adjacently arranged to said tile carpet or said fiber fabrication layer unit and including a side end portion of said another tile carpet or another fiber fabrication layer unit, wherein, said portions at which each of said side end portions of a plurality of said tile carpets or of a plurality of said fiber fabrication layer units being adjacently abutted to each other are fixedly connected to each other, or said portions at which a part of each one of a plurality of said tile carpets or a plurality of said fiber fabrication layer units which are adjacently arranged to each other, are mutually overlapped with each other, are fixedly connected to each other, by utilizing adhesive, by performing a thermal melting treatment or by seaming treatment with threads, and wherein said longitudinal sheet material further comprises a first longitudinal sheet material and a second longitudinal sheet material, and wherein said first and said second longitudinal sheet materials are connected with each other with or without interposing a reinforcing sheet therebetween, in a way so that said backing layers or said fiber fixing portions of both said first and second longitudinal sheet materials are oppositely faced to each other, or so that said backing layers of one of said first and second longitudinal sheet materials are oppositely faced to said fiber fixing portions of said opposite longitudinal sheet material, or so that either one of said backing layers and said fiber fixing portions of either one of said first and second longitudinal sheet materials are oppositely faced to said fiber assembled layer of the other of said first and second longitudinal sheet material.

12. A sheet material having a longitudinal configuration, said longitudinal sheet material being formed so that a plurality of unit sheet materials are adjacently arranged to each other with side by side configuration in two dimensional direction, before said unit sheet materials are put on a floor so as to be carryable, and wherein said sheet material is cut out to produce a backing layer used for recycled tile carpet, wherein said unit sheet materials are either one of a tile carpet comprising a fiber assembled layer comprising a plurality of loop piles or a plurality of cut piles both of which are flexible and tufted in a base fabric both of which being made of thermoplastic and organic material and a backing layer made only of thermoplastic synthetic resin, or a piece of fiber fabrication layer unit which has a predetermined unit surface area and which comprises a fiber assembled layer comprising a plurality of loop piles or a plurality of cut piles tufted in a base fabric both of which being made of thermoplastic and organic material and having a predetermined thickness with a fiber fixing portion containing therein said thermoplastic synthetic resin formed on a part of said fiber assembled layer unit, and at least on a part of a surface of said fiber fixing portion, a shearing separation treatment surface being provided, wherein on a portion at which a plurality of said tile carpets or a plurality of said fiber fabrication layer units are adjacently connected to each other, a side end portion of each one of said tile carpets or said fiber fabrication layer units, is fixedly abutted on an oppositely arranged side end portion of another tile carpet or another fiber fabrication layer unit which is adjacently arranged to said tile carpet or said fiber fabrication layer unit, or at least a part of said tile carpet or said fiber fabrication layer unit including said side end portion thereof is mutually overlapped with at least a part of another tile carpet or another fiber fabrication layer unit which being adjacently arranged to said tile carpet or said fiber fabrication layer unit and including a side end portion of said another tile carpet or another fiber fabrication layer unit, wherein, said portions at which each of said side end portions of a plurality of said tile carpets or of a plurality of said fiber fabrication layer units being adjacently abutted to each other are fixedly connected to each other, or said portions at which a part of each one of a plurality of said tile carpets or a plurality of said fiber fabrication layer units which are adjacently arranged to each other, are mutually overlapped with each other, are fixedly connected to each other, by utilizing adhesive, by performing a thermal melting treatment or by seaming treatment with threads, and wherein said longitudinal sheet material further comprises a first longitudinal sheet material and a second longitudinal sheet material, and wherein said first and said second longitudinal sheet materials are connected with each other with or without interposing a reinforcing sheet therebetween, in a way so that said backing layers or said fiber fixing portions of both said first and second longitudinal sheet materials are oppositely faced to each other, or so that said backing layers of one of said first and second longitudinal sheet materials are oppositely faced to said fiber fixing portions of the other of said first and second longitudinal sheet material, or so that either one of said backing layers and said fiber fixing portions of either one of said first and second longitudinal sheet materials are oppositely faced to said fiber assembled layer of said separate longitudinal sheet material, and further wherein said first and second longitudinal sheet materials are connected with each other in a way in that either one of connecting lines and overlapping lines formed among a plurality of unit sheet materials each being adjacently arranged to each other in said first longitudinal sheet material, is displaced from either one of said connecting lines and said overlapping lines formed among a plurality of unit sheet materials each being adjacently arranged to each other in said second longitudinal sheet material.

\* \* \* \* \*